(12) United States Patent
Huang et al.

(10) Patent No.: US 10,715,575 B2
(45) Date of Patent: Jul. 14, 2020

(54) IN-SERVICE QUALITY MONITORING SYSTEM WITH INTELLIGENT RETRANSMISSION AND INTERPOLATION

(71) Applicant: Dolby Laboratories Licensing Corporation, San Francisco, CA (US)

(72) Inventors: Shen Huang, Beijing (CN); Doh-Suk Kim, Cupertino, CA (US); Xuejing Sun, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 343 days.

(21) Appl. No.: 15/170,271

(22) Filed: Jun. 1, 2016

(65) Prior Publication Data

US 2016/0359943 A1  Dec. 8, 2016

Related U.S. Application Data

(60) Provisional application No. 62/189,389, filed on Jul. 7, 2015.

(51) Int. Cl.
*H04L 29/06* (2006.01)
*H04M 7/00* (2006.01)
(Continued)

(52) U.S. Cl.
CPC .......... *H04L 65/80* (2013.01); *H04L 43/0829* (2013.01); *H04L 65/1083* (2013.01);
(Continued)

(58) Field of Classification Search
CPC ............. H04L 12/1813; H04L 12/1818; H04L 12/1827; H04L 12/189; H04L 65/1046;
(Continued)

(56) References Cited

U.S. PATENT DOCUMENTS 6,741,569 B1   5/2004   Clark
7,269,157 B2   9/2007   Klinker
(Continued)

FOREIGN PATENT DOCUMENTS

EP   1693986   8/2006
EP   1993233   7/2009
(Continued)

OTHER PUBLICATIONS

Zhang, X. et al "Using P2P Overlay to improve VoIP Quality in S1P+P2P System", 2009 WASE International Conference on Information Engineering, vol. 1 pp. 255-259, Jul. 2009.
(Continued)

*Primary Examiner* — Vivek Srivastava
*Assistant Examiner* — William C McBeth

(57) ABSTRACT

A service request for communication services for communication clients is received. In response, a communication service network is set up to support the communication services. Routing metadata is generated for each of the communication clients. The routing metadata is to be used by each of the communication clients for sharing service quality information with a respective peer communication client over a light-weight peer-to-peer (P2P) network. The routing metadata is downloaded to each of the communication clients. A communication client may exchange service signaling packets or service data packets over the communication service network. When the communication client determines that there is a problematic region in a bitstream received from the communication server, the communication client can request a peer communication client for a service quality information portion related to the problematic region.

12 Claims, 12 Drawing Sheets

(51) Int. Cl.
*H04L 29/08* (2006.01)
*H04L 12/26* (2006.01)

(52) U.S. Cl.
CPC .......... *H04L 65/403* (2013.01); *H04L 67/104* (2013.01); *H04M 7/0084* (2013.01); *H04L 69/10* (2013.01)

(58) Field of Classification Search
CPC ............. H04L 65/1066; H04L 65/1069; H04L 65/1083; H04L 65/403; H04L 65/4038; H04L 65/80; H04L 67/104; H04M 3/2227; H04M 3/2236; H04M 3/56; H04M 3/567; H04M 7/006; H04M 7/0084; H04N 7/15; H04N 7/152; H04W 88/06
See application file for complete search history.

(56) References Cited

U.S. PATENT DOCUMENTS

| | | | |
|---|---|---|---|
| 7,433,358 B1 | 10/2008 | Volkaerts | |
| 7,502,337 B2 | 3/2009 | Kosanovic | |
| 7,617,337 B1 | 11/2009 | Beck | |
| 7,693,965 B2 | 4/2010 | Rhoads | |
| 8,111,618 B2 | 2/2012 | Li | |
| 8,199,654 B2 | 6/2012 | Francisco | |
| 8,745,177 B1 | 6/2014 | Kazerani | |
| 9,332,561 B1* | 5/2016 | Khawam | H04L 65/1069 |
| 10,129,412 B1* | 11/2018 | Singh | H04L 65/1046 |
| 2003/0023672 A1* | 1/2003 | Vaysman | H04L 12/1827 709/203 |
| 2006/0252376 A1* | 11/2006 | Fok | H04M 3/2236 455/67.13 |
| 2006/0268828 A1* | 11/2006 | Yarlagadda | H04L 45/123 370/352 |
| 2008/0062997 A1 | 3/2008 | Nix | |
| 2009/0034426 A1* | 2/2009 | Luft | H04L 41/5009 370/252 |
| 2011/0225247 A1* | 9/2011 | Anantharaman | H04M 3/568 709/206 |
| 2011/0252151 A1* | 10/2011 | Lu | H04W 80/045 709/228 |
| 2011/0273995 A1 | 11/2011 | Ahn | |
| 2011/0316965 A1* | 12/2011 | Moore | H04L 12/1827 348/14.09 |
| 2013/0028115 A1* | 1/2013 | Nerst | H04L 12/1827 370/252 |
| 2013/0246642 A1* | 9/2013 | Chen | H04L 67/14 709/228 |
| 2014/0064137 A1 | 3/2014 | El-Hennawey | |
| 2014/0086081 A1 | 3/2014 | Mack | |
| 2014/0160972 A1 | 6/2014 | Ketonen | |
| 2014/0219230 A1 | 8/2014 | Schierl | |
| 2014/0241215 A1* | 8/2014 | Massover | H04L 12/1818 370/260 |
| 2014/0269674 A1* | 9/2014 | Meghani | H04L 65/4015 370/352 |
| 2016/0021007 A1* | 1/2016 | Shuman | H04W 76/23 370/235 |
| 2016/0323892 A1* | 11/2016 | Pradini | H04W 76/23 |
| 2017/0090864 A1* | 3/2017 | Jorgovanovic | G06F 3/167 |
| 2017/0118666 A1* | 4/2017 | Patel | H04W 76/25 |
| 2017/0289894 A1* | 10/2017 | Palm | H04W 76/14 |
| 2018/0234866 A1* | 8/2018 | Johnsson | H04L 65/80 |

FOREIGN PATENT DOCUMENTS

| | | |
|---|---|---|
| WO | 2009/022055 | 2/2009 |
| WO | 2012/089708 | 7/2012 |
| WO | 2014/085093 | 6/2014 |
| WO | 2014/160926 | 10/2014 |
| WO | 2014/182782 | 11/2014 |
| WO | 2015/003027 | 1/2015 |

OTHER PUBLICATIONS

Choi, Y.H. et al "End-to-End Quality of Service Monitoring Using ICMP and SNMP" Lecture Notes in Computer Science, vol. 3262, pp. 40-49, Oct. 2004.

Agrawal, S. et al "Design of Active and Passive Probes for VoIP Service Quality Monitoring" Nov. 2006, Telecommunications Network Strategy and Planning Symposium, pp. 1-6.

Pelaez, J. "Using Misuse Patterns for VoIp Steganalysis" Sep. 2009, 20th International Workshop on Database and Expert Systems Application, DEXA 2009, pp. 160-164.

Lua, Eng Keong et al "A Survey and Comparison of Peer-to-Peer Overlay Network Schemes" Second Quarter 2005, vol. 7, No. 2, IEEE Communications Surveys, pp. 72-93.

* cited by examiner

IN-SERVICE QUALITY MONITORING SYSTEM WITH INTELLIGENT RETRANSMISSION AND INTERPOLATION

CROSS-REFERENCE TO RELATED APPLICATIONS

The present application claims the benefit of priority from U.S. Provisional Pat. No. 62/189,389, filed Jul. 7, 2015, and International Application Number PCT/CN2015/080585, filed Jun. 2, 2015, each of which is incorporated herein by reference in its entirety.

TECHNOLOGY

Example embodiments disclosed herein relates generally to quality monitoring of voice over Internet protocol (IP) (VoIP) services and in particular, to in-service quality monitoring of VoIP services.

BACKGROUND

In commercial communication system, real time monitoring quality of service provided to the customers, especially voice quality under adverse network condition is a critical feature.

Service monitoring of audio or video conferencing quality at regular time intervals often lacks detailed diagnosis information because potential information facilitating quality diagnosis has been discarded by packet loss. For example, voice over Internet protocol (IP) (VoIP) services are often supported by networks built on client-server architecture models. Lost information at downlinks of these networks is difficult to be reclaimed from the server side. As a result, quality estimation occasionally incurs unreliable output statistics, resulting in false alarms or false detections. The absence of information for quality diagnosis or false monitoring results can degrade users' experience and significantly impact users' perception of qualities of these services.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

Example embodiments disclosed herein illustrated by way of example, and not by way of limitation, in the figures of the accompanying drawings and in which like reference numerals refer to similar elements and in which.

SUMMARY OF INVENTION

Figure 1A:
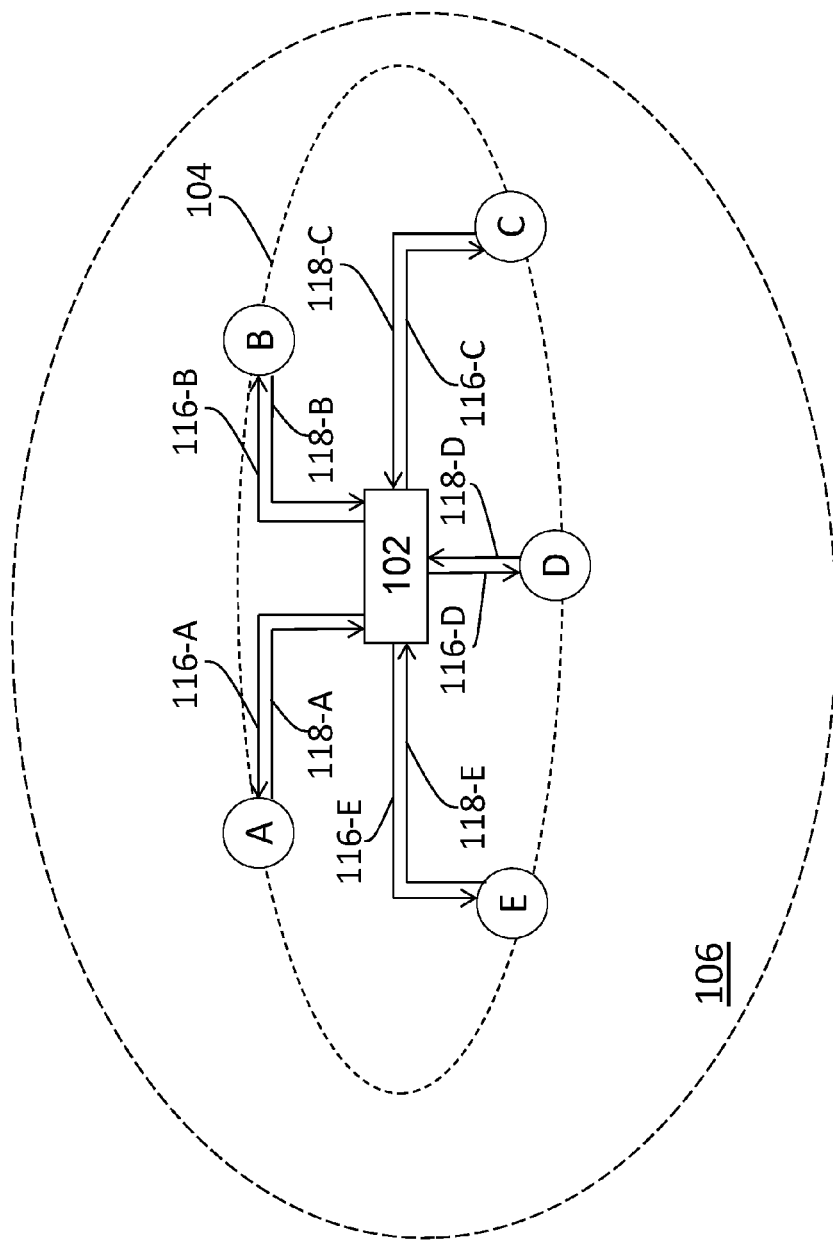
FIG. 1A illustrates an example configuration of a communication system in accordance with example embodiments disclosed herein.

A service request is received for one or more communication services for two or more communication clients. In response to receiving the service request, a communication service network is set up to support the one or more communication services. The communication service network has uplinks from and downlinks to the two or more communication clients for transporting service signaling packets and service data packets. Routing metadata is generated for each of the two or more communication clients. The routing metadata is to be used by each of the two or more communication clients for sharing service quality information with a respective peer communication client over a light-weight peer-to-peer (P2P) network. The routing metadata is downloaded to each of the two or more communication clients.

One or more of service signaling packets or service data packets of one or more communication services are exchanged over the communication service network with a communication server. The routing metadata from the communication server is used for requesting service quality information with a peer communication client over the light-weight P2P network. It is determined whether there is a problematic region in a bitstream received from the communication server. In response to determining that there is a problematic region in the bitstream received from the communication server, a service quality information portion related to the problematic region is requested from the peer communication client.

These and other example embodiments and aspects are detailed below with particularity.

DESCRIPTION OF EXAMPLE EMBODIMENTS

Example embodiments, which relate to in-service quality monitoring of VoIP services, are described herein. In the following description, for the purposes of explanation, numerous specific details are set forth in order to provide a thorough understanding of the example embodiments disclosed herein. It will be apparent, however, that the present invention may be practiced without these specific details. In other instances, well-known structures and devices are not described in exhaustive detail, in order to avoid unnecessarily occluding, obscuring, or obfuscating the example embodiments disclosed herein.

1. General Overview

This overview presents a basic description of some aspects of example embodiments described herein. It should be noted that this overview is not an extensive or exhaustive summary of aspects of the example embodiments. Moreover, it should be noted that this overview is not intended to be understood as identifying any particularly significant aspects or elements of the example embodiments, nor as delineating any scope of the example embodiments in particular, nor the invention in general. This overview merely presents some concepts that relate to the example embodiments in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

As a part of quality assurance in delivering communication services to users, feedbacks regarding the quality of service should be timely provided to the user in real time or near real time. However, accurately monitoring quality of service in real time or near real time for many communication services is exceedingly difficult to do. For example, VoIP communication services may be supported by a communication service network (e.g., using server-client network architecture and the like) in which downlinks and/or uplinks between a communication server and its communication clients are susceptible to various network impairments that affect conveyance of service signaling packets comprising signaling information, service data packets comprising audio content, metadata comprising service quality information and the like.

Techniques as described herein can be used to enable a communication service system including but not limited to communication clients operated by users/participants to acquire or re-acquire relatively accurate and relatively timely quality information even when some or all of the communication clients experience network impairments that would affect their abilities of gathering the quality information under other approaches.

A communication server in accordance with techniques described herein may be configured to determine/identify quality problems in uplinks of communication clients (e.g., far-end communication clients of an end-to-end link) with active talking participants (e.g., based on specific packet loss concealment algorithms applied for specific types of lost or damaged packets originated from the communication clients). The communication server may be further configured to provide quality information related to the uplinks to a recipient communication client (e.g., a near-end communication clients of the end-to-end link) over a downlink. Additionally, optionally, or alternatively, the communication server may broadcast and/or aggregate acoustic quality information received from the uplinks to the recipient communication link over the downlink.

Service data packets may be transmitted via a downlink from the communication server to a communication client. A bitstream comprising audio frames may be decoded from encoded audio content or payloads in the service data packets. When the downlink is impacted by network impairments caused by packet losses, distortions, and the like, the communication client may automatically identify problem regions in the bitstream, and mark these problematic regions as potentially impactful audio frame lost group that needs to be further diagnosed. Additionally, optionally, or alternatively, for any missing bitstream quality information caused by the network impairments, the communication client may automatically use a light-weight P2P overlay network to obtain bitstream quality information.

The light-weight P2P overlay network under techniques as described herein may be an overlay network (e.g., in response to a service request) set up by the communication server to support acquisition and re-acquisition of quality information among the communication clients. The light-weight P2P overlay network may be separate from a communication service network that is set up by the communication server to support transmission and reception of service signaling packets, service data packets, metadata embedded in these packets and the like, for the purpose of delivering one or more communication services (e.g., VoIP communication services, VoIP call services, VoIP conference call services, internet-based communication services and the like) to users/participants operating the communication clients.

The communication server may download routing metadata including but not limited to data fields, parameters and the like, for routing protocols, routing tables, etc. For example, the routing metadata may comprise an optimal routing flag accompanying an entry of a peer communication client in a lookup table as described herein sent by the communication server to each communication client. This optimal routing flag and other information in the routing metadata may be used by a communication client to identify (e.g., an IP address of, a node ID of, and the like) the peer communication client or a backup peer communication client, in case the former communication client needs to request information from the latter communication client.

A communication client as described herein may be configured to use location information of a problematic region such as packet loss, distortions and the like, affecting the receipt of audio frames to query a peer communication client over the light-weight P2P overlay network for bitstream quality information related to the problematic region. The problematic region may be located in a portion of a communication service session such as an analysis window of a few seconds, a few tens of seconds or another time duration.

The communication client may send to the peer communication client one or more requests for bitstream quality information for one or more problematic regions in the analysis window and receive from the peer communication client one or more responses containing the requested bitstream quality information for the problematic regions in the analysis window. The requests from the requesting communication clients and responses from the peer communication clients may use a minimal amount of data volume (e.g., one or more data fields, one or more bit fields, light-weight labels and the like) in the light-weight P2P overlay network. The bitstream quality information received from the peer communication client may include perceptual importance levels of the problematic regions and may be used by the requesting communication client to assign (perceptually importance dependent) weight factors to features extracted or other derived for the problematic regions or the analysis window.

If no peer communication client is available for requesting and obtaining bitstream quality information of problematic regions, a communication client that experience network impairments causing the problematic regions in the analysis window (one of a plurality of analysis windows) of the communication service session may adopt one or more approximation schemes. For example, the bitstream quality information of the problematic regions may be treated as hidden information to be predicted or estimated using one or more of hidden Markov modeling (HMM) techniques, packet loss concealment (PLC) techniques and the like. Additionally, optionally, or alternatively, if a problematic region comprises a relatively limited number (e.g., one, two, three or another positive integer) of lost or damaged audio frames, the bitstream quality information of the problematic region such as perceptual importance, loudness levels, energy levels, etc., may be estimated or interpolated with information from available adjacent audio frames before or after the problematic region. Additionally, optionally, or alternatively, in a problematic region with a relatively large number (e.g., five, six, ten or another positive integer) of lost or damaged audio frames, perceptual importance levels of some lost or damaged audio frames (e.g., near the edges of a problematic region) may be estimated or approximated using one technique, while perceptual importance levels of some lost or damaged audio frames (e.g., in the interior of the problematic region) may be estimated or approximated using a different technique.

Some or all of techniques as described herein can be implemented through in-service monitoring (ISM) modules deployed with communication clients. For example, an ISM module may be integrated with a respective communication client or may operate as a separate module to a respective communication client. Additionally, optionally, or alternatively, process flows implemented by the ISM modules and the communication server can be dynamically controlled on the fly, based on actual network conditions in the communication service network and/or the light-weight P2P overlay network. The information acquired from peer communication clients or estimated by impacted communication clients independently may be used to assign perceptually relevant weight factors to network features, acoustic features, features of other types, extracted or derived in the analysis window for the purpose of performing relatively accurate assessment, and reducing residual errors and probability of outliers in predictions/estimations, of quality of service for the communications services such as commercial grade communication services enabled through VoIP techniques.

As discussed, techniques as described herein can be used to provide one or more of robust frameworks, diverse embodiments, reasonably complete solutions, etc., for assessing/estimating service quality of communication services in an accurate and timely manner, even when there are network impairments, distortions or the like, that would have otherwise affected capabilities of network elements to acquire and convey quality information of the communication services under other approaches.

In some example embodiments, mechanisms as described herein form a part of a communication service system, including but not limited to any of: conference phones, IP phones, cloud-based communication service systems, premise-based communication service systems, handheld devices, mobile phones, game machines, laptop computers, netbook computers, tablet computers, cellular radiotelephones, desktop computers, computer workstations, computer servers, computer kiosk, or various other kinds of terminals and communication devices.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Quality Assessment System Configurations

Techniques as described herein can be used to enhance performance and accuracy of service quality monitoring, especially in-service monitoring with respect to quality assessment of communication call services such as VoIP services, audio conferencing, video conferencing or other services. These techniques are applicable to diverse operational scenarios of these communication services. For example, the techniques as described herein can be used to determine and monitor qualities related to down links, up links, end-to-end links or the like, of a communication service even when network impairments (e.g., packet losses, distortions, delays, jitters, bit errors) affect conveyance of useful quality information related to these links.

FIG. 1A illustrates an example configuration comprising a communication server 102, two or more communication clients (e.g., A, B, C, D, E), a communication service network 104 that is established (e.g., through one or more of VoIP signaling protocols, call setup procedures) by the communication server (102) in a communication service session (e.g., a conference call session, a VoIP call session) to support one or more specific communication services (e.g., VoIP services, audio conferencing, video conferencing) to the communication clients (e.g., A, B, C, D, E), etc.

Each of the communication clients (e.g., A, B, C, D, E) may be implemented through one or more computing devices, and may represent one or more of an IP phone device, a conference phone device, a mobile phone, an office desk phone, a personal computer, a tablet, a wearable computer, etc.

The communication server (102) may be operatively linked with the two or more communication clients (e.g., A, B, C, D, E) through a plurality of uplinks (e.g., 118-A, 118-B, 118-C, 118-D, 118-E) from the communication clients (e.g., A, B, C, D, E) to the communication server (102) and a plurality of downlinks (e.g., 116-A, 116-B, 116-C, 116-D, 116-E) from the communication server (102) to the communication clients (e.g., A, B, C, D, E) in the communication service network (104). The communication service network (104) can be implemented as one or more networks (e.g., virtual networks, physical networks, mesh networks, ring networks, point-to-point networks, a combination of the foregoing) based on a communication client-server architecture model. In some embodiments, the communication service network (104) represents a topologically radiative network in which the communication server (102) forms a network or a sub-network with each of the communication clients (e.g., A, B, C, D, E), a mesh network, a combination of multiple networks, a P2P network, etc. In some embodiments, the communication service network (104) is an overlay network built (e.g., at the beginning of a communication service session such as a conference call session, a VoIP call session) over an underlying network 106 (e.g., a part of the Internet, a network cloud).

The underlying network (106) may represent one or more of parts of the Internet, intranet, core networks, transport networks, access networks, wireless networks, wired networks, optical networks, wireless local area networks, home-based networks, premise-based networks, etc. In some embodiments, whereas the communication service network (104) may be built or provisioned on demand (e.g., in response to one or more of the communication clients dialing into specific numbers, in response to one or more of the communication clients accessing certain web pages) for the purpose of supporting one or more communication services to the communication clients (e.g., A, B, C, D, E), the underlying network (106) may or may not be particularly built or provisioned for the purpose of supporting any particular communication services to the communication clients (e.g., A, B, C, D, E).

In some embodiments, at an initial stage of the communication service session or alternatively before the communication service session, the communication server (102) and the communication clients (e.g., A, B, C, D, E) exchange service signaling packets with one another to set up the communication service network (104).

Over the communication service network (104), the one or more (e.g., real time, non-real-time) communication services such as one or more of VoIP services, audio conferencing, video conferencing and the like may be delivered to, and/or maintained for, two or more clients (e.g., A, B, C, D, E) by the communication server (102) for the duration of the communication service session.

For example, audio content (e.g., participants' voices, echo, reverberation, noise) captured at a communication client (e.g., one of A, B, C, D, E, an end point device not set in mute state) in the communication service session may be transmitted by the communication client to the communication server (102) through an uplink (e.g., one of 118-A, 118-B, 118-C, 118-D, 118-E) from the communication client to the communication server (102). The audio content transmitted by the communication client over the uplink (or the uplink audio content) may be contained in (uplink) audio frames carried as payloads of (uplink) service data packets from the communication client to the communication server (102). Each uplink audio frame in the uplink audio frames may be mapped to a globally unique (e.g., across all the communication clients) audio frame sequence number assigned to corresponding downlink audio frames that derive audio content from that uplink audio frame.

Uplink audio content (e.g., participants' voices, echo, reverberation, noise) received by the communication server (102) from communication client (e.g., B, C, D, E, the far-end communication clients) with talking participants located far-end relative to a near-end communication client (A in this example) in the communication service session may be processed by the communication server (102), and transmitted as downlink audio content by the communication server (102) to the near-end client through a downlink (116-A in the present example) from the communication server (102) to the near-end client (A). The audio content over the downlink (or the downlink audio content) may be contained in downlink audio frames carried as payloads of (downlink) service data packets from the communication server (102) to the near-end client.

Thus, the downlink audio content via the downlink from the communication server (102) to the near-end client is derived from the uplink audio content via the uplinks from the far-end communication clients with talking participants to the near-end communication client.

An audio frame as described herein may comprise an audio content portion for a time interval of 5 milliseconds, 10 milliseconds, 20 milliseconds, 30 milliseconds or another time length.

In some embodiments, the communication server (102) may comprise one or more network elements each of which may be implemented in software, hardware, a combination of software and hardware, etc. In some embodiments, the communication server (102) may be a distributed system in which its software and/or hardware components may be located in different spatial locations, in different network topological locations, etc. In some other embodiments, the communication server (102) may be a centralized system in which its software and/or hardware components may be located in the same location, in the same network topological location, etc.

Figure 1B:
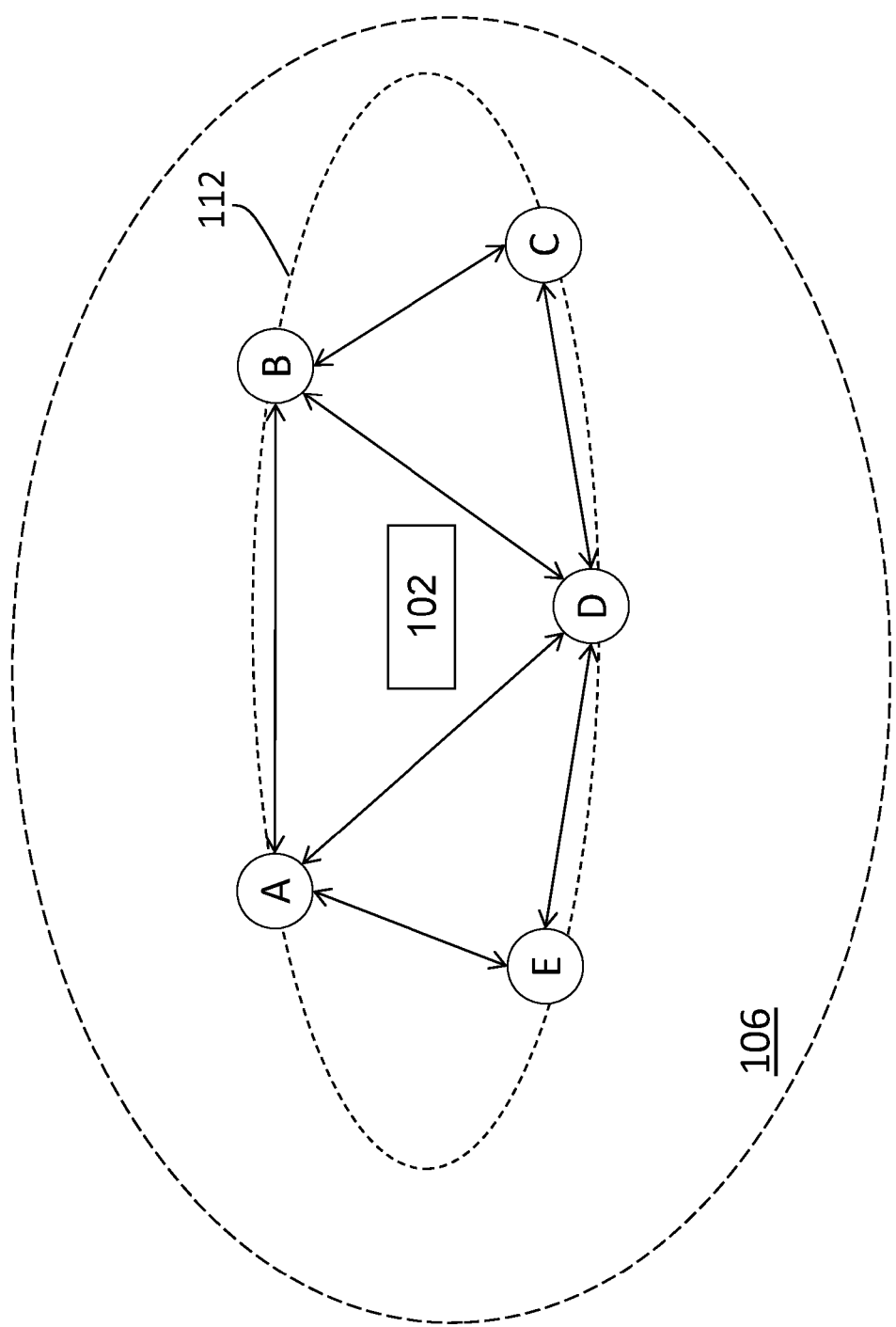
FIG. 1B illustrates an example of a light-weight peer-to-peer (P2P) overlay network system in accordance with example embodiments disclosed herein.
Figure 1C:
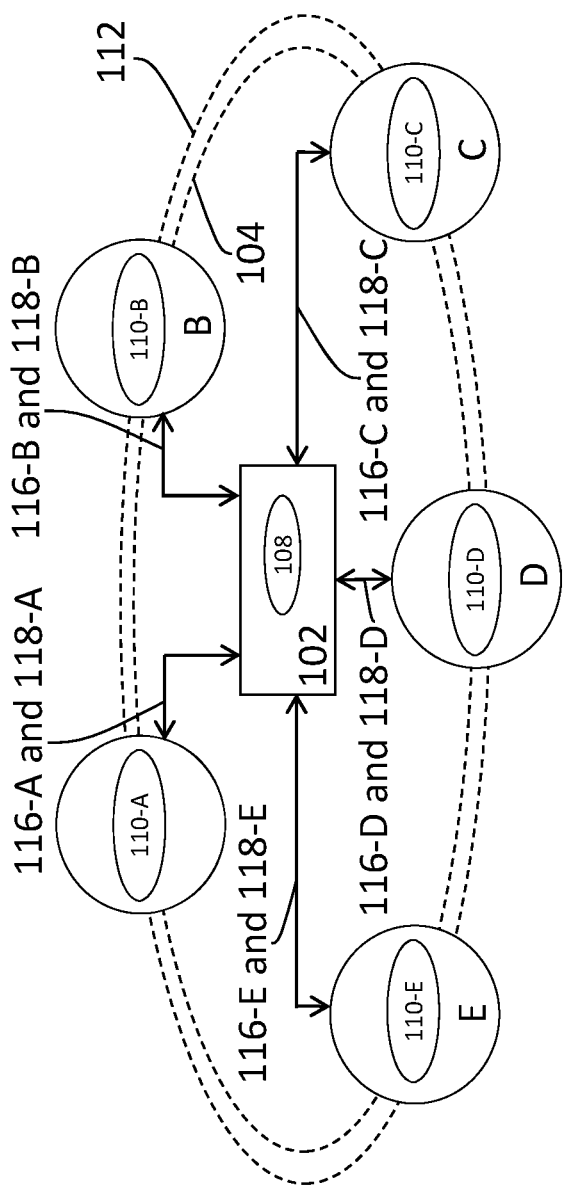
FIG. 1C illustrates an example communication server operating in conjunction with a plurality of in-service monitors in accordance with example embodiments disclosed herein.

In some embodiments, as shown in FIG. 1C, the communication server (102) may comprise at least a media server 108 to deliver and maintain the communication services to the communication clients (e.g., A, B, C, D, E) in the communication service session. In some embodiments, even when a communication client (e.g., A) experiences network impairments that at least cause the quality of the communication services to the communication client (A) to suffer, the communication server and network elements involved continue to attempt to deliver service data packets and service signaling packets, and maintain the communication services with whatever achievable quality of services such as best efforts, etc., to the communication client (A), so long as the communication service session is not terminated.

In some embodiments, some or all of bitstream quality information for determining the quality of the communication services can be collected by the communication server (102) from in-service monitors (e.g., 110-A, 110-B, 110-C, 110-D, 110-E) deployed with, or implemented as parts of, the communication clients (e.g., A, B, C, D, E), as illustrated in FIG. 1C. For example, the communication clients (e.g., A, B, C, D, E), or the in-service monitors (e.g., 110-A, 110-B, 110-C, 110-D, 110-E) therewith, may be configured to send the bitstream quality information to the communication server (102) in a relatively timely and accurate manner as metadata (e.g., as a sub-bitstream of an overall bitstream) embedded within service signaling packets (which carries signaling information), service data packets (which carry audio frames), etc., over the communication service network (104).

However, when there are network impairments in the communication service network (104) affecting some (e.g., A) of the communication clients (e.g., A, B, C, D, E), it may be difficult for these communication clients (e.g., A, B, C, D, E), or the in-service monitors (e.g., 110-A, 110-B, 110-C, 110-D, 110-E) therewith, to continue sending the bitstream quality information to the communication server (102) in a relatively timely and accurate manner over the communication service network (104) in which the network impairments occur, without implementing some or all of the techniques as described herein.

3. Light-Weight Peer-To-Peer Overlay Network

Under techniques as described herein, in some embodiments, a light-weight P2P overlay network 112 an example of which is illustrated in FIG. 1B may be established among the communication clients (e.g., A, B, C, D, E) of the communication server (e.g., 102) in the communication service session. The light-weight P2P overlay network (112) may be an overlay network (e.g., a mesh network, a ring network) implemented over the underlying network (106), and may be a separate overlay network over the underlying network (106), separate from the communication service network (104) through which the communication server (102) delivers communication services (e.g., through exchange of service signaling packets, service data packets) such as VoIP services, audio conferencing, video conferencing and the like, to the communication clients (e.g., A, B, C, D, E).

In some embodiments, the media server (108) of the communication server (102) may set up, configure and control the light-weight P2P overlay network (112) to enable the communication clients (e.g., A, B, C, D, E) to share, transmit, receive, etc., some or all of the bitstream quality information as described herein. Through the light-weight P2P overlay network (112), a communication client (e.g., A) can request and collect at least some of bitstream quality information from another communication client (e.g., B, an optimally selected communication client relative to A in the light-weight P2P overlay network 112) to compensate for the loss of such information, even if network impairments in the communication service network (104) affect certain communication clients' abilities (e.g., A's ability) to receive or transmit bitstream quality information via the communication service network (104). The bitstream quality information collected from an optimally selected communication client in the light-weight P2P overlay network (112) can be used to improve the accuracy of quality estimation/assessment of the communication services provided by the communication server (102) to the communication clients (e.g., A, B, C, D, E) in the communication service session.

In some embodiments, when there are network impairments in the communication service network (104) causing missing bitstream quality information (or hidden bitstream quality information) to a communication client (e.g., A), even if there are no optimally selected clients available in the light-weight P2P overlay network (112) for providing the missing bitstream quality information, the communication client (e.g., A) can be configured to estimate and make up for the missing bitstream quality information on its own based on adjacent service data frames previously or subsequently received by the communication client (A), a prior history of bitstream quality information available to the communication client (A), without receiving bitstream quality information from other communication clients (e.g., B, C, D, E) over the light-weight P2P overlay network (112).

4. Example Operational Scenarios

Figure 2:
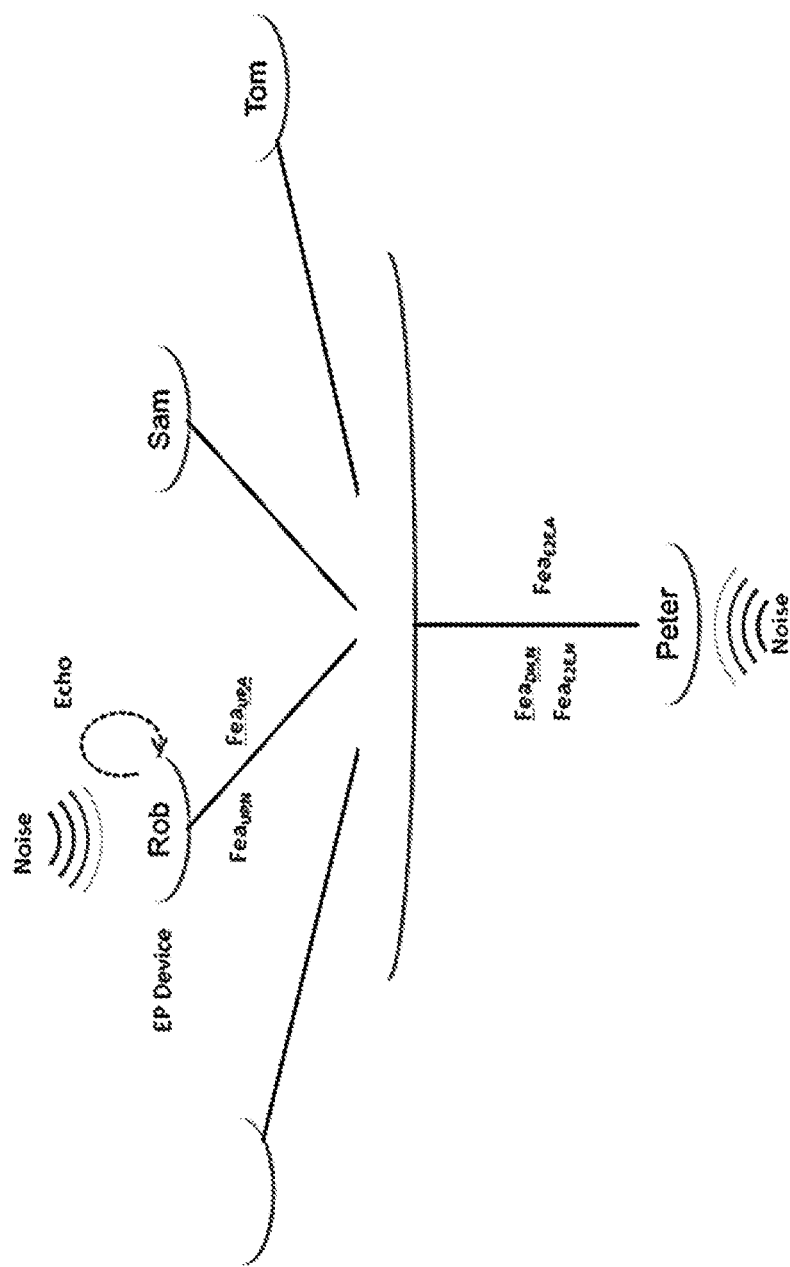
FIG. 2 depicts an example of a basic diagram of network quality of an "in service monitoring" (ISM) system where both media server and clients are displayed in a radiative topology in accordance with example embodiments disclosed herein.

FIG. 2 depicts an example of a basic diagram of network quality at an "in service monitoring" (ISM) system where both media server and clients are displayed in radiative topology in accordance with example embodiments disclosed herein. More specifically, FIG. 2 illustrates operational scenarios in which participants such as "Rob", "Sam", "Tom", "Peter" utilize one or more (e.g., real time, non-real-time) communication services provided by a communication server (e.g., 102 of FIG. 1A or FIG. 1B) via respective communication clients (e.g., A, B, C, D, E of FIG. 1A, FIG. 1B or FIG. 1C).

As used herein, a participant refers to a user or a group of users that is located at a spatial location such as a conference room, an office, a venue, a cubical, etc., and operates a communication client (e.g., A, B, C, D, E of FIG. 1A or FIG. 1B) as an end point device (denoted as "EP Device" in FIG. 2). A communication client, or an EP device, may be a conference phone device, a mobile phone, an office desk phone, a tablet, a wearable computer, etc., configured to take part in a communication service session for the communication services provided by the communication server (102 of FIG. 1A or FIG. 1B) over a communication service network (e.g., 104 of FIG. 1A, FIG. 1B or FIG. 1C).

In some embodiments, the communication server (102) may, but is not limited to only, be network cloud based. In some embodiments, the communication server (102), or a media server (e.g., 108 of FIG. 1C) therein, and the communication clients (e.g., A, B, C, D, E of FIG. 1A or FIG. 1B) used by the participants (e.g., "Rob", "Sam", "Tom", "Peter") are operatively linked in the communication service network (104) that forms a radiative network topology.

In some embodiments, different participants and/or their respective communication clients may be associated with different network features (e.g., in terms of bandwidth, level of quality of service, packet losses, delays, jitters, bit errors), different acoustic features (e.g., in terms of peak signal-to-noise ratio, signal-to-noise ratio, peak noise level, noise level, echo, reverberation, device type, device acoustic properties, acoustic characteristics related to audio content captured from active talking participants), etc. For way of example, a first participant ("Rob") who uses a first communication client may be located in a first spatial location with first network features, first acoustic features, or features of other types. For the purpose of illustration only, the first acoustic features may correspond to a relatively significant amount of noise, echo, reverberation, etc. A second participant ("Peter") who uses a second communication client may be located in a second spatial location with second network features, acoustic features or features of other types. The second network features, second acoustic features or second features of the other types, may correspond to a relatively significant amount of noise, but not echo (e.g., from the far-end sounds rendered at the spatial location). Some other participants may be at locations with other network features, acoustic features or features of other types, corresponding to one or more of different network quality of service (QoS), different bandwidths, different noise levels, different echo properties, different reverberation properties, different noise sources, etc.

5. Network and Acoustic Features and Quality Measurements

In some embodiments, one or more in service monitoring (ISM) modules (e.g., 110-A, 110-B, 110-C, 110-D, 110-E of FIG. 1C) are deployed on the communication clients (e.g., A, B, C, D, E of FIG. 1A, FIG. 1B or FIG. 1C) operated by the participants (e.g., "Rob", "Sam", "Tom", "Peter"). In some embodiments, the one or more ISM modules (e.g., 110-A, 110-B, 110-C, 110-D, 110-E of FIG. 1C) are deployed at a communication client (e.g., A, B, C, D, E of FIG. 1A, FIG. 1B or FIG. 1C) and configured to extract, acquire and/or track per-client network features, acoustic features and the like, from the communication client's perspective. For example, a (e.g., target) communication client of a participant (e.g., "Peter") maintains and track per-client network features, acoustic features or features of other types, from the perspective of the communication client of the participant ("Peter").

Under techniques as described herein, the per-client network features, acoustic features or features of other types, extracted, acquired and/or tracked by an ISM module (e.g., 110-A, 110-B, 110-C, 110-D, 110-E of FIG. 1C) as described herein may be used for assessing/determining qualities of the communication services in some or all portions of the communication service session from a communication client's perspective. In some embodiments, a quality of service may be assessed/determined using a quality measurer function as follows:

$$Q_{L,T}\{Fea_i\}, 1<=i<=I_{L,T} \quad (1)$$

where $Q_{L,T}$ denotes the quality measurer function; $Fea_i$ denotes one or more features (e.g., network features, acoustic features or features of other types) that serve as input to evaluate the quality measurer function; and $I_{L,T}$ is the total number of the features for evaluating the quality measurer function $Q_{L,T}$ at link direction L and quality type T. This function may be evaluated using a regression model with the features as input.

L refers to a link direction of the communication client and the media server, and may be one of the following values: UP (or an uplink in the communication service network 104 from a communication client of an active talking participant to the media server 108), DN (or a downlink in the communication service network 104 from the media server 108 to a communication client), E2E (or an end-to-end link comprising a downlink in the communication service network 104 from the media server 108 to a near-end communication client overlaid with one or more uplinks in the communication service network 104 of one or more active talking participants from one or more far-end communication clients to the media server 108), etc.

T refers to a quality type for which the quality measurer function is being used to measure, and may be one of the following values: N (or network quality of service), A (or acoustics quality of service) or the like. Additionally, optionally, or alternatively, in some embodiments, quality measurer functions may be defined for types other than network quality of service or acoustic quality of service. For example, T may refer to device utilization (or occupancy), device load condition, etc.

For example, per-client network features for assessing/determining network quality of service from the perspective of a (target) communication client (e.g., A) of the participant "Peter" may comprise downlink network features $F_{DN,N}$ for evaluating $Q_{DN,N}$, end-to-end network features $F_{E2E,N}$ for evaluating $Q_{E2E,N}$ or the like. A difference between $Q_{DN,N}$ and $Q_{E2E,N}$ is that $Q_{DN,N}$ represents a quality indicator that reflects network impairments affecting a downlink (e.g., from the media server to the communication client A, 116-A) without accounting for any network impairments affecting a uplink (e.g., from a far-end communication client of the participant "Rob" to the media server) of an end-to-end link, which may be assessed/determined by uplink network features $F_{UP,N}$ for $Q_{UP,N}$ within the same analysis (e.g., time, 5 seconds, 20 seconds) window in which $Q_{DN,N}$ is determined, whereas $Q_{E2E,N}$ represents a quality indicator that reflects both the network impairments from the downlink of a near-end communication client (that of the participant "Peter" in the present example) and the network impairments from one or more uplinks related to one or more far-end communication clients (e.g., that of the participant "Rob" in the present example).

In some embodiments, one or more ISM modules (e.g., 110-A, 110-B, 110-C, 110-D, 110-E) of a communication client (e.g., A, B, C, D, E)—which may be, but is not necessarily limited to only, one with an active talker in the communication service session—may be configured to transmit features for computing/evaluating one or more quality measurer functions as described herein as a part of bitstream quality information (e.g., as in band metadata carried in service signalling packets, service data packets) to the media server (108) of the communication server (102) over the communication service network (104). For example, acoustic features may be transmitted from the communication clients (e.g., A, B, C, D, E)—which may be, but are not necessarily limited to only, those with active talkers in the communication service session—to the media server (108) over the uplinks (e.g., 118-A, 118-B, 118-C, 118-D, 118-E).

In some embodiments, in response to receiving features for computing quality measurer functions from a communication client (e.g., A, of an active talking participant), the media server (108) is configured to broadcast some or all of the received features as a part of bitstream quality information (e.g., as in band metadata carried in service signalling packets, service data packets) to other communication clients (e.g., B, C, D, E) in the same communication service session over the communication service network (104).

In some embodiments, features for computing/evaluating quality measurer functions as described herein may be extracted within a particular analysis window length (e.g., time, 5 seconds, 20 seconds) with a less window stride (1 second, 2 seconds) of the communication service session (e.g., 5 minutes, 30 minutes, 45 minutes). Since downlink acoustic content in payloads of service data packets as delivered by the media server to a (e.g., target, recipient) communication client (or a near-end communication client) in an analysis window of the communication service session is composed of uplink acoustic content received by the media server from other communication clients (or far-end communication clients) in the same time window, the downlink acoustic service quality experienced by the near-end communication client in the analysis window is (e.g., largely, entirely) determined by the aggregated uplink acoustic service qualities of the far-end communication clients within the same analysis window. As a result, the downlink acoustic quality measurer function $Q_{DN,A}$ of the near-end communication client may be deemed to equal the end-to-end acoustic quality measurer function $Q_{E2E,A}$ of the near-end communication client, as the downlink acoustic content in the downlink to the near-end communication client and the end-to-end link from the far-end communication clients to the near-end communication client is the same.

In some embodiments, acoustic features, etc., can be directly estimated by each communication client from uplink audio content (e.g., containing one or more of a corresponding participant's voice, noises, echo, reverberation), which is to be sent by the communication client as payloads of service data packets to the media server (108). These acoustic features, etc., of the uplink audio content may be sent by each communication client to the media server (108) as a part of metadata in the service data packets, service signalling packets or the like, over a respective uplink (e.g., 118-A, 118-B, 118-C, 118-D, 118-E) in the communication service network (104). The acoustic features, etc., as received by the media server (108) can then be broadcasted by the media server (108) to other communication clients (e.g., in pre-designed data formats within the service signalling packets, service data packets).

Additionally, optionally, or alternatively, in some embodiments, the media server (108) is configured to aggregate some or all of the received features such as acoustic features as described herein. The aggregated features may be sent by the media server (108) as a part of bitstream quality information (e.g., as in band metadata carried in service signalling packets, service data packets) to other communication clients (e.g., B, C, D, E) in the same communication service session over the downlinks of the communication service network (e.g., 104 of FIG. 1A). This approach may be used to avoid broadcasting individual pre-aggregated features over downlinks, but may incur a cost of some processing burdens to the media server (108).

Service quality analyses under techniques as described herein, such as performed by an ISM module of a communication client, a media server, etc., may or may not be performed in strictly real time. In various embodiments, the service quality analyses may be performed in real time, near real time, non-real-time, within a certain time delay window such as 5 seconds, 20 seconds or another time length and stride, which may depend on the analysis window length and stride.

When network impairments such as packet loss, distortions, etc., affect a downlink, an uplink or the like in the communication service network (104), bitstream quality information carried as metadata in service signalling packets, service data packets or the like may be discarded in packet delivery in the communication service network (104).

6. Network Impairments and Quality Assessment

Under other approaches, end-to-end service quality analysis may be difficult to assess as bitstream quality information for computing end-to-end service quality measures may include information for both downlinks and uplinks, when some of these links are affected by network impairments. For example, when a communication client device of a talking participant suffers from network impairments such as uplink packet loss, etc., in the communication service network (104), bitstream quality information such as acoustic features related to uplink audio content originated from the talking participant may be difficult to be transmitted by the communication client to the media server over the communication service network (104). As a result, under these other approaches that rely on the communication service network (104) to pass bitstream quality information, the end-to-end service quality may not be properly assessed or determined for the time duration of the communication service session when network impairments affect related links in the communication service network (104).

In contrast, under techniques as described herein, in response to detecting network impairments that affect transmitting or receiving bitstream quality information with respect to a communication client (e.g., A) over the communication service network (104), the communication client (A) may be configured to request and acquire at least some of the bitstream quality information in real time, near real time, non-real-time, etc., over a light-weight P2P overlay network (e.g., 112 of FIG. 1B or FIG. 1C) by the communication client (A) from another communication client (e.g., one of B, C, D, E) that is optimally selected (e.g., the nearest neighbour) from the light-weight P2P overlay network (112). This provides an alternative mechanism in which bitstream quality information may be acquired through a separate overlay network in addition to the communication service network (104).

In some embodiments, the light-weight P2P overlay network (112) is independently set up over an underlying network (e.g., 106 of FIG. 1A or FIG. 1B), and comprises at least some peer-to-peer connections that do not rely on downlinks and uplinks in the communication service network (104); thus, those peer-to-peer connections may operate in a normal state independent of network impairments affecting the downlinks and uplinks in the communication service network (104).

In some embodiments, the light-weight P2P overlay network (112) may comprise some peer-to-peer connections that overlap with some downlinks and uplinks in the communication service network (104); however, some or all of those peer-to-peer connections may still operate in a normal or near normal state with little or no impact from network impairments affecting the downlinks and uplinks in the communication service network (104). This is because sizes of data exchanged among peers in the light-weight P2P overlay network (112) are relatively small, and also because in-service quality monitoring may or may not be performed in strictly real time.

Figure 3:
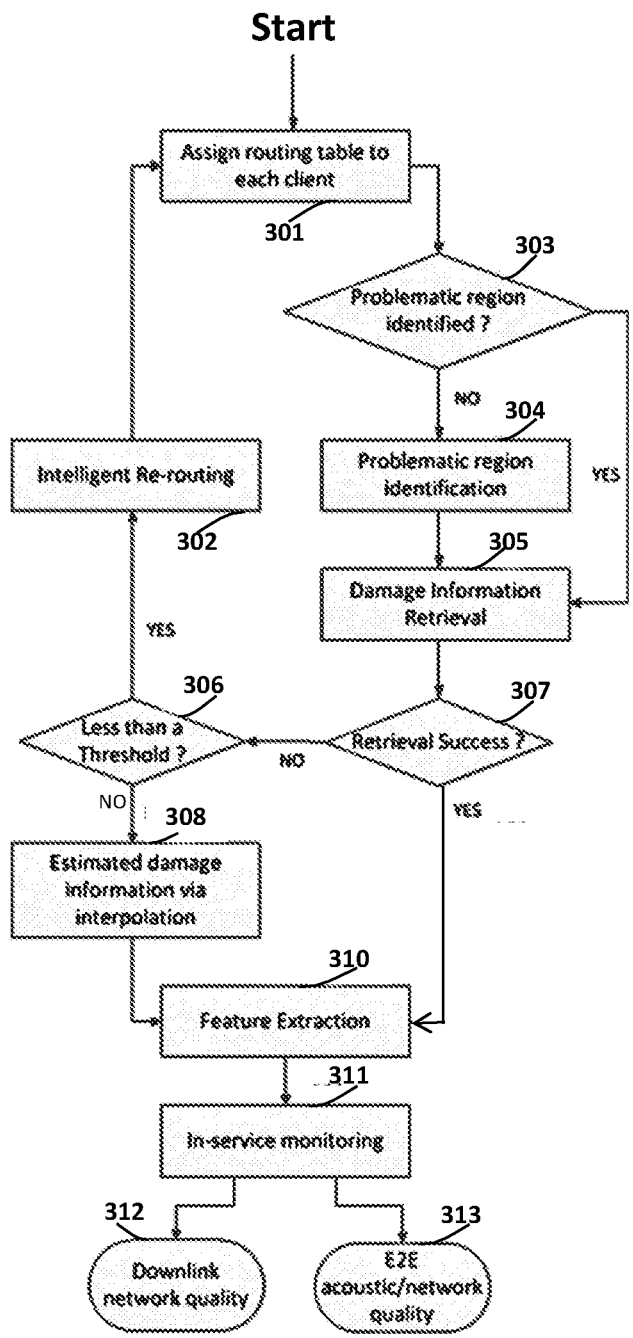
FIG. 3 illustrates an example flowchart of operations performed by an in-service monitoring system in accordance with example embodiments disclosed herein.

FIG. 3 illustrates an example flowchart of operations performed by an in-service monitoring system. For the purpose of illustration only, the in-service monitoring system may be implemented by in-service monitors (e.g., 110-A, 110-B, 110-C, 110-D, or 110-E of FIG. 1C) of communication clients (e.g., A, B, C, D, or E of FIG. 1A, FIG. 1B or FIG. 1C) and a media server (e.g., 108 of FIG. 1C) of a communication server (e.g., 102 of FIG. 1A, FIG. 1B or FIG. 1C).

A communication service network (e.g., 104 of FIG. 1A or FIG. 1C) may be established for example by the communication server (102) and the communication clients (e.g., A, B, C, D, E) using VoIP protocol operations to support a communication service session such as a conference call session, a VoIP call session, etc., among the communication clients (e.g., A, B, C, D, E).

In some embodiments, the communication server (102), for example the media server (108) therein, may be configured to build a light-weight P2P overlay network (e.g., 112 of FIG. 1B) at an initial stage of the communication service session. The light-weight P2P overlay network (112) may be separate from the communication service network (104) and may be used to convey bitstream quality information among the communication clients (e.g., A, B, C, D, E) as peers. In some embodiments, the light-weight P2P overlay network (112) is established before any client experiences network impairments such as packet losses, etc., in the communication service network (104). In some other embodiments, the light-weight P2P overlay network (112) is established when at least one client experiences network impairments such as packet losses, distortions, etc., in the communication service network (104).

In block 301, the communication server (102) causes routing protocols, routing tables, etc., to be set up for the light-weight P2P overlay network (112). For example, the media server (108) may be configured to build routing tables for peer communication clients to communicate with one another in the light-weight P2P overlay network (112).

Under techniques as described herein, any in a wide variety of approaches can be used for the purpose of setting up routing protocols, routing tables, etc., in the light-weight P2P overlay network. In some embodiments, the routing tables may comprise a nearest routing look-up table (LUT) for each of the communication clients (e.g., A, B, C, D, E) in the light-weight P2P overlay network (112). The nearest routing LUT may comprise values (e.g., IP addresses, next hops, delays) that can be looked up with key values (e.g., a hostname, an LUT entry number).

By way of example and not limitation, the communication clients (e.g., A, B, C, D, E) may be denoted as $Client_i$ ($1<=i<=N$). The nearest routing LUT for a communication client (Client) may comprise data field values pointing to other communication clients ($Client_j$ ($1<=j<=N$; $j \neq i$)) that are within the minimum N shortest delay distances to the communication client ($Client_i$). In some embodiments, a delay distance as described herein between the communication client ($Client_i$) and any of the communication clients ($Client_j$ ($1<=j<=N$; $j \neq i$)) may be measured as a "ping" delay between the two clients. The nearest routing LUT may be used to identify a communication client $R_i$ that is the closest to the communication client (Client) as follows:

$$R_i = \mathrm{argmin}_j(d_{ij}), (1 \leq j \leq N, j \neq i), \qquad (2)$$

where $d_{ij}$ denotes a (e.g., "ping" measured) delay distance between the communication client ($Client_i$) and any of the communication clients ($Client_j$).

In some embodiments, a nearest routing LUT specific to each communication client may be downloaded from the media server (108) to the communication client at one or more times in the communication service session. For example, the nearest routing LUT may be downloaded from the media server (108) to the communication client at the beginning of the communication service session, at the end of an analysis window, every 20 seconds, only when there is configuration change in the light-weight P2P overlay network (112), only after a set of overall delay measurements in the light-weight P2P overlay network (112) is completed, etc. In some embodiments, after an initial downloading of the nearest routing LUT from the media server (108) to the communication client, only changes thereafter to the nearest routing LUT may be downloaded from the media server (108) to the communication client.

In block 303, each communication client determines whether a problematic region in the communication service region has been identified. In some embodiments, a problematic region in the communication service session may refer to a portion of the communication service session in which a communication client experiences one or more missing audio frames, for example, caused by packet loss in a corresponding downlink in the communication service network (104).

In block 304, if a communication client (for example C) determines that no problematic region in the communication service region has been identified, the communication client (C) continues to wait for a problematic region identification to occur.

In block 305, if a communication client (for example A) determines that a problematic region in the communication service region has been identified, the communication client (A) is configured to report the problematic region to the media server (108). Additionally, optionally, or alternatively, the communication client (A) may be configured to request a peer communication client (for example B) for bitstream quality information such as perceptual damage information, etc., related to the problematic region. The peer communication client (B) may be an optimally selected communication client $R_i$ that is the closest to the communication client (A) (e.g., in terms of one or more of "ping" delays, routing metrics, path lengths, hop counts) according to the nearest routing LUT downloaded by the media server (108) to the communication client (A).

In block 307, it is determined whether the retrieval of the bitstream quality information requested by the communication client (A) from the peer communication client (B) is successful. Any such failure may be reported by the communication client (A) to the media server (108).

In block 306, if it is determined that the retrieval of the bitstream quality information requested by the communication client (A) from the peer communication client (B) is unsuccessful, the communication client (A) increments a failure count (initially set to 0) and determines whether the failure count is less than a failure count threshold (e.g., 2, 3, 4, a dynamically configurable value, a user overridable value).

In block 302, in response to determining that a failure count is less than a failure count threshold, the communication client (A) may perform intelligent rerouting. For example, based on the nearest routing LUT, the communication client (A) may determine that there is a backup peer communication client available for requesting the bitstream quality information.

In response to determining that the failure count is not less than a failure count threshold, in block 308, the communication client (A) estimate the bitstream quality information such as damage information on its own, for example, via interpolating using adjacent available audio frames or coded bitstreams immediately surround the problematic region.

In block 310, the communication client (A) performs feature extraction for network features, acoustic features or features of other types for assessing/determining network and/or acoustic qualities of services. In some embodiments, higher level network and/or acoustic features may also be generated and/or aggregated based on the network features, acoustic features or features of other types for reflecting network or acoustic problems in the communication service session.

In block 311, the in-service monitoring system utilizes some or all of the above mentioned features to generate quality estimation reports (e.g., a quality score, a quality summary value etc.) for the communication service session or for one or more portions (e.g., one or more analysis windows) of the communication service session. The quality estimation report may include, without limitation, downlink network quality of service (312), end-to-end network and acoustic qualities of service (313), etc.

In some embodiments, an end-to-end network quality of service can be estimated by a communication client based on bitstream quality information for all the problematic regions occurred in a bitstream decoded from packets received by the communication client via a respective downlink. In some embodiments, a downlink network or acoustic quality of service may refer to quality assessment of problematic regions that are not caused by uplink losses. In some embodiments, when delivering service data packets from the media server (108) to a downlink communication client, the media server (108) may be configured to signal or inform the downlink communication client which problematic regions in the downlink bitstream correspond to problematic regions that have already been created in upper transmission. In some embodiments, a downlink acoustic quality of service may be deemed as equivalent to an end-to-end acoustic quality of service, since it may be assumed that, while there may be network loss/damage in the downlink transmission, no acoustic damage/loss is introduced in the downlink transmission.

Figure 4:
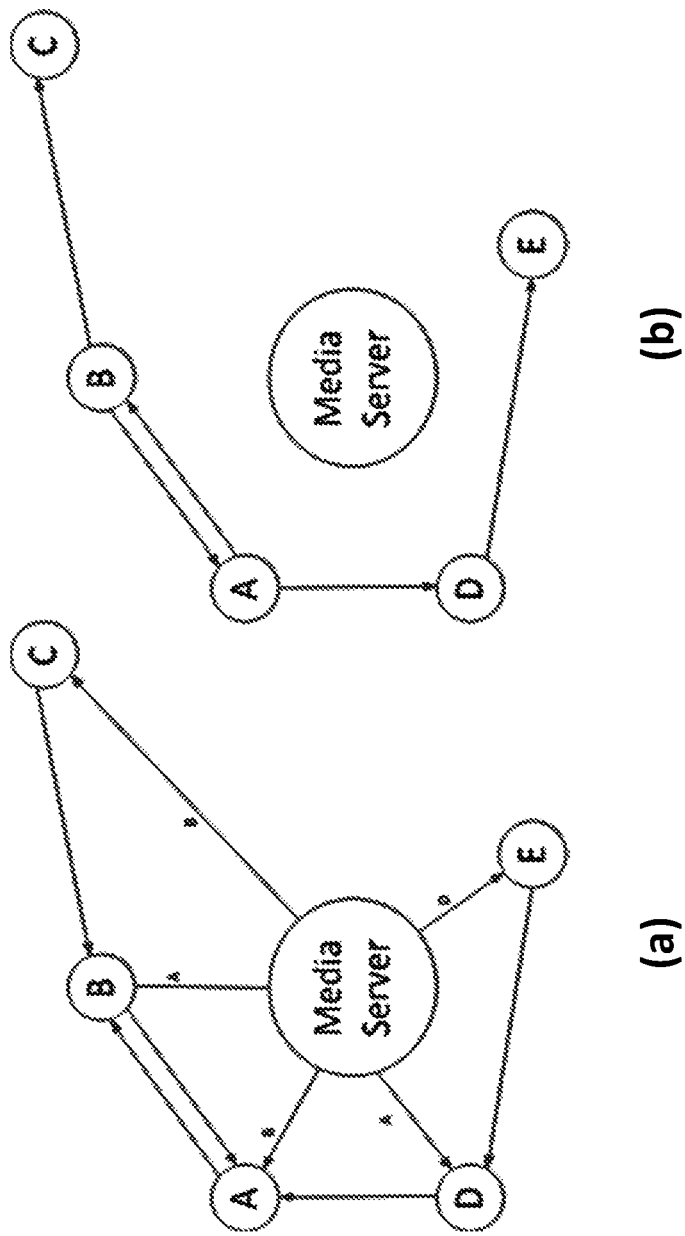
FIG. 4 illustrates an example of an intelligent routing scenario in a light-weight P2P overlay network in accordance with example embodiments disclosed herein.

FIG. 4 illustrates example intelligent routing scenarios in a light-weight P2P overlay network (e.g., 112 of FIG. 1B or FIG. 1C) as described herein. A media server (e.g., 108 of FIG. 1C) of a communication server (e.g., 102 of FIG. 1A, FIG. 1B or FIG. 1C) is located at central locations of graphs (a) and (b) of FIG. 4, whereas communication clients (e.g., A, B, C, D, E) as represented by circles surround the media server (108).

In a non-limiting implementation example, the media server (108) is configured to be responsible for generating and delivering routing metadata such as routing tables in the form of nearest routing LUTs to the communication clients (e.g., A, B, C, D, E), for example, at the beginning of a communication service session as described herein, right before the commencement of a communication service session as described herein, etc.

During the communication service session, the routing metadata maintained by the media server (108) may, but need not, be sent to the communication clients (e.g., A, B, C, D, E) for every audio frame, every analysis window, etc. In some embodiments, the media server (108) can update the communication clients (e.g., A, B, C, D, E) with up-to-date routing metadata at a relatively long regular time interval (e.g., every 20 seconds, every 30 seconds, every minute, every several minutes). Additionally, optionally, or alternatively, the media server (108) can update the communication clients (e.g., A, B, C, D, E) with up-to-date routing metadata in response to detecting problems (e.g., routing problems in the light-weight P2P overlay network 112, downlink and/or uplink problems in a communication service network 104) affecting one or more of the communication clients (e.g., A, B, C, D, E).

After the most recent routing metadata has been sent from the media server (108) to the communication clients (e.g., A, B, C, D, E), each of the communication clients (e.g., A, B, C, D, E) can be configured to store some or all of the received routing metadata including, but not limited to only, an optimally selected peer communication client $R_i$ to which missing bitstream quality information may be requested and obtained by the former communication client. In some embodiments, a communication client may have more than one communication clients available for requesting and obtaining the missing bitstream quality information. For example, the communication client may have one peer communication client as a primary or active peer for requesting and obtaining the missing bitstream quality information, and have zero or more other peer communication clients as secondary or backup peers for requesting and obtaining the missing bitstream quality information in case the primary or active peer cannot be accessed for the information. In some embodiments, a communication client may serve as an information provider for more than one communication client, and may supply missing bitstream quality information to more than one communication client upon request.

As shown in graph (a) of FIG. 4, the media server (108) may be configured to send a respective nearest routing LUT to each of the communication clients (e.g., A, B, C, D, E). According to the nearest routing LUTs respectively received from the media server (108), the communication clients (B and D) are to request and obtain some or all of any missing bitstream quality information from the communication client (A). As shown in graph (b) of FIG. 4, the communication clients (B and D) request and obtain their respective missing bitstream quality information from the communication client (A) over the light-weight P2P overlay network (112), when the communication client (A) encounters one or more problematic regions in the communication service session that may be caused by problems affecting downlinks and/or uplinks in the communication service network (104).

The media server (108) may be configured to (e.g., occasionally) detect one or more (e.g., problematic) communication clients (denoted as P(k), 1<=k<=M) which cannot provide missing bitstream quality information as peer communication clients to other communication clients as directed by the routing metadata downloaded by the media server (108) to each of the communication clients (e.g., A, B, C, D, E). The media server (108) may be configured to update the routing metadata to cause the problematic communication clients to be excluded as peer communication clients for providing missing bitstream quality information to other communication clients. In the updated routing metadata, any peer communication client (denoted as $R_i^{old}$) belonging to a set of the problematic communication clients (denoted as $R_i \in P(k)$, 1<=k<=M) for a communication client (denoted $R_j$) may be replaced by a new peer communication client (denoted as $R_i^{new}$) as follows:

$$R_i^{new} = \mathrm{argmin}(d_{ij}), j \neq \{R_i^{old}, i\}, \text{ if } R_i^{old} \in P(k), 1 \leq k \leq m \quad (3)$$

In some embodiments, problematic regions in the communication service session as described herein can be identified if any of the problematic regions meets one or both of the following two conditions:

Condition 1: $F(f(BS_{k,i-1}^{Client_A}), f(BS_{k,j+1}^{Client_A})) >$ thre, if $S_k < L_{burst}$; \quad (4)

Condition 2: $L_{burst} \leq S_k \leq L_{burstlimit}$; \quad (5)

where $S_k$ is the number of consecutive lost packets at the k-th frame loss group in an analysis window of a communication client (denoted as $Client_A$ in expression (4)). These consecutive lost packets may represent lost audio frames from frame index i to j. $BS_{k,i-1}^{Client_A}$ represents a received audio frame immediately preceding the k th frame loss group, whereas $BS_{k,j+1}^{Client_A}$ represents a received audio frame immediately following the k th frame loss group. $L_{burst}$ and $L_{burstlimit}$ ($L_{burst} < L_{burstlimit}$) represent two lost audio frame count thresholds. In a non-limiting example, $L_{burst}$ represents a first lost audio frame count threshold equivalent to one of 40 milliseconds, 60 milliseconds, 80 milliseconds, etc., whereas $L_{burstlimit}$ represents a second, greater lost audio frame count threshold equivalent to one of 1 second, 2 seconds, 3 seconds or more, etc.

Condition 1 in expression (4) means that the problem severity of the k-th frame loss group (denoted as $PR_k$) can be decided by two adjacent audio frames if a complexity of the consecutive lost packets as indicated by the function F is less than a threshold "thres". In a non-limiting example, the function F may be implemented as a difference operation between two values (e.g., perceptual loudness levels) respectively derived from the two adjacent audio frames; each of the two values may be derived by a non-linear mapping function (e.g., the function $f$ in expression (4)) that maps audio content (e.g., audio samples, coefficients in a transform domain) in a respective audio frame in the two adjacent audio frames. In some embodiments, the symbol "Thre" may represent a perceptual loudness difference value (e.g., in units of Sones). In a non-limiting example, Condition 2 in expression (5) may indicate that the frame loss group k represents a span of audio frame loss so large to constitute a bursty loss, which should be classified as a problematic region in the analysis window. In some embodiments, if $S_k$ exceeds the second lost audio frame count threshold, the quality of service is to be considered to be sufficiently bad, for example, to be given a (e.g., a fixed, a preconfigured) low score such as 0 on a scale of 0-5, where a higher value indicates a higher quality of service.

Conditions 1 and 2 in expressions (4) and (5) can be used to identify problematic regions in the analysis window for further investigation. A communication client in which any problematic regions exist or are experienced may be called a problematic client, and may retrieve at least some of bitstream quality information from a peer communication client in the light-weight P2P overlay network (112). In some embodiments, the bitstream quality information to be requested and obtained by the problematic client may include, but is not limited to only, perceptual importance levels of audio content in lost audio frames in the problematic regions.

In the present example, after these problematic regions ($PR_k$) in the analysis window are identified, the communication client ($Client_A$) stores the problematic regions ($PR_k$) with the total count of K in memory, proceeds to request at least some of bitstream quality information related to each of the problematic regions ($PR_k$) from a peer communication client (e.g., the nearest communication client in the light-weight P2P overlay network 112) as indicated in the nearest routing LUT of the communication client ($Client_A$).

In some embodiments, the communication clients (e.g., A, B, C, D, E) may be configured to share a synchronous time clock. In some embodiments, at least two of the communication clients (e.g., A, B, C, D, E) may not share a synchronous time clock. Additionally, optionally, or alternatively, the communication clients (e.g., A, B, C, D, E) may operate asynchronously, resulting in different delays (e.g., processing delays, transmission delays). In multiple transmissions between a problematic client and its peer communication client (Client$_{Ri}$), some or all of the multiple transmissions from the peer communication client (Client$_{Ri}$) may take different time lengths (e.g., +/− tens of milliseconds, +/− hundreds of milliseconds) as compared with the time lengths the problematic client takes to request, receive and process portions of the requested bitstream quality information in these transmissions.

In some embodiments, the analysis window may be selected to be relatively long as compared with these time lengths in aggregate. Additionally, optionally, or alternatively, the problematic client may assign each request (e.g., among multiple requests for the bitstream quality information of the identified problematic regions) to the peer communication client (Client$_{Ri}$) with a globally unique (e.g., across all communication clients in the same communication service session) sequence number (e.g., an incrementing integer). The assigned sequence number in each of the requests may be returned by the peer communication client (Client$_{Ri}$) in a response from the peer communication client.

In some embodiments, the problematic client may be configured to determine, for example based on reference anchor time points corresponding to the time points of requests from the problematic client and non-reference ancho time points corresponding to the time points of responses from the peer communication client (Client$_{Ri}$), whether the peer communication client (Client$_{Ri}$) takes more time or less time to provide a response than the problematic client takes to request and process information in the response and to proceed to issue the next request to the peer communication client (Client$_{Ri}$).

In response to determining that the peer communication client takes less time, the problematic client may issue a current request, process a response to a current request and issue the next request without waiting. In response to determining that the peer communication client (Client$_{Ri}$) takes less time, the problematic client may inject a wait time in issuing a current request, processing a response to the current request, and issuing the next request. In various embodiments, these and other flow control methods may be used in transmitting and receiving the bitstream quality information between the problematic client and the peer communication client (Client$_{Ri}$), until all the requested bitstream quality information is received by the problematic client for all the identified problematic regions (PR$_k$, 1<=k<=K) in the analysis window.

In some embodiments, bitstream quality information as requested by a problematic client (Client$_A$) from a peer communication client (Client$_{Ri}$) may include, but is not limited to only, a perceptual importance level of each of identified problematic regions in an analysis window. For the purpose of illustration only, the perceptual importance level may be a perceptual loudness level. The perceptual importance level can be computed, and transmitted to the problematic client (Client$_A$) using only a few bits, by the peer communication client (Client$_{Ri}$). In some embodiments, the problematic client (Client$_A$) may be configured to deduce a feature set Fea$^{Client_A}$ comprising network features, acoustic features, etc., for each of the identified problematic regions. The perceptual importance level of each problematic region in the analysis window, as received from the peer communication client (Client$_{Ri}$), may be used by the problematic client (Client$_A$) to generate an enhanced feature set MFea$^{Client_A}$ comprising one or more of modified network features, modified acoustic features or modified features of other types for the analysis window, as follows:

$$Level_k^{Client_B} = f(BS_{k,i,j}^{Client_B}) \quad (6)$$

$$MFea^{Client_A}{}_* = \frac{\sum_{k=1}^{K} G(Fea_k^{Client_A}, Level_k^{Client_B}, S_k)}{N} \quad (7)$$

where K represents the total count of problematic regions identified by the problematic client (Client$_A$) in the analysis window; $f$ represents a non-linear mapping function (used by the peer communication client Client$_{Ri}$) that maps audio content in problematic region (corresponding to the k-th frame loss group) to perceptual loudness level; S$_k$ represents the number of lost frames in kth frame loss group; N represents the total count of frames with positive voice activity detection (VAD frames) in the analysis window; G represents a function for enhancing features for each of frame loss groups based on the (e.g., aggregated, mean, median, maximum) perceptual importance level Level$_k^{Client_B}$ obtained by the peer communication client (Client$_B$=Client$_{Ri}$) for that frame loss group with lost frames i to j.

By way of example and not limitation, the enhanced feature set Fea$^{Client_A}$ to generated by the problematic client (Client$_A$) based at least in part on perceptual importance levels obtained from the peer communication client (Client$_{Ri}$) may comprise a modified packet loss rate MPLR and a modified burstiness factor MBF as follows:

$$MPLR = \frac{\sum_{j=1}^{J} FPL_j}{\sum_{j=1}^{N} FPL_j}; \quad (8)$$

$$MBF = 1 - \frac{\sum_{k=1}^{K} EPL_k}{\sum_{j=1}^{J} FPL_j}; \quad (9)$$

where N denotes the total number of VAD frames in the analysis window; J and K denote the total count of lost frames and the total count of frame loss groups, respectively; FPL$_j$ denotes a Frame Packet Loss factor of the j-th packet loss frame index; EPL denotes an Event Packet Loss factor of the k-th frame loss group. As used herein, an occurrence of consecutive packet loss may be referred to as a packet loss group.

Under some approaches, a packet loss ratio (PLR) and a burstiness factor (BF) are independent of perceptual importance levels of any particular frame loss groups; hence, EPL$_k$=FPL$_j$=1 under those approaches. In contrast, MPLR and MBF are evaluated with perceptual importance levels obtained by the problematic client (Client$_A$) from the peer communication client (Client$_{Ri}$) as follows:

$$EPL_k = \frac{\sum_{j=1}^{S_k} \sum_{m=1}^{M} Level_{m,PLI_j}}{S_k}; \quad (10)$$

$$FPL_j = \sum_{m=1}^{M} Level_{m,PLI_j} \quad (11)$$

where $\text{Level}_{m,PLIj}$ denotes the perceptual importance level at the m-th dimension of the j-th packet loss indication $PLI_j$, which is an index pointing to the j-th lost frame in the k-th problematic region, and may be obtained by the problematic client ($\text{Client}_A$) from the peer communication client ($\text{Client}_{Ri}$). In some embodiments, the m-th dimension of the j-th packet loss indication $PLI_j$ may refer to audio content portion in the m-th frequency bin in a set of M frequency bins, in the m-th critical band in a set of M critical bands. In some embodiments, a level value as represented by a symbol "Level" here may, but is not limited to only, a scalar number. In some embodiments, a level value is a vector or matrix value comprising a plurality of values each of which is a level for a frequency band or a soft-band such as an ERP band of a plurality of bands.

7. Sharing Bitstream Quality Information Among Clients

Figure 5:
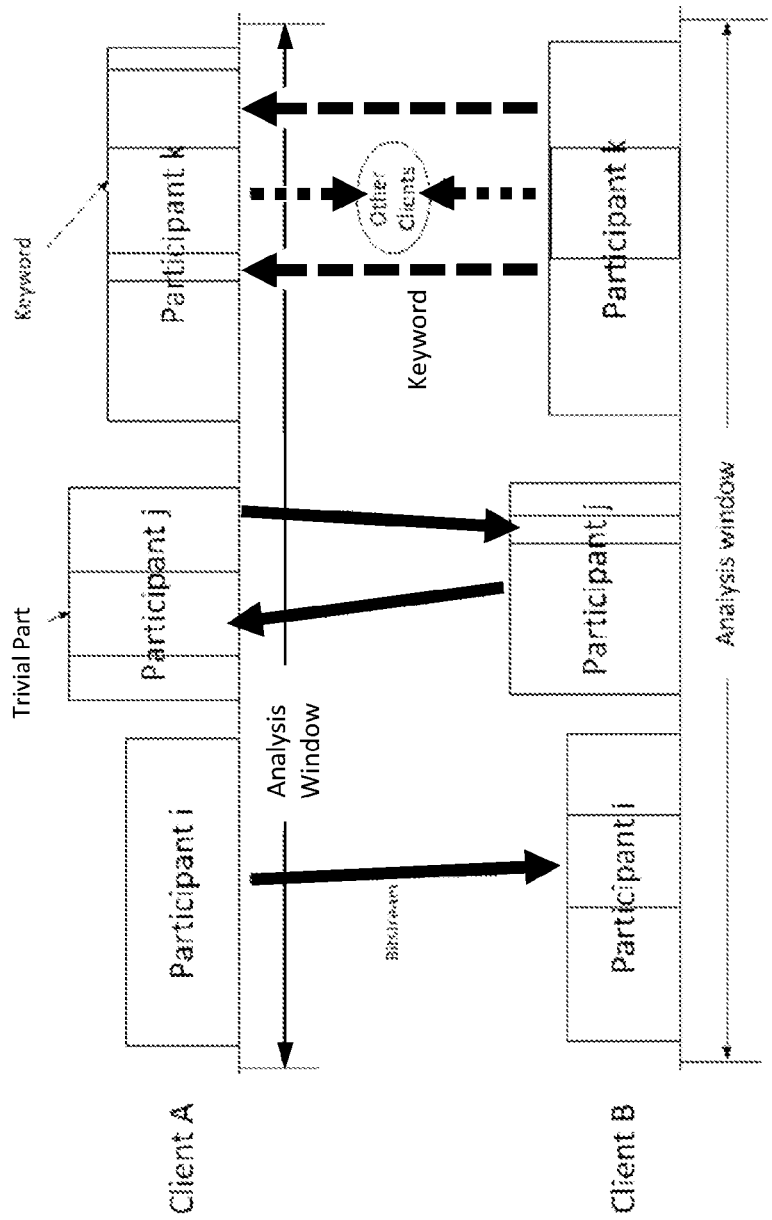
FIG. 5 illustrates an example of data flows for sharing bitstream quality information among communication clients in accordance with example embodiments disclosed herein.

FIG. 5 illustrates example data flows for sharing bitstream quality information among communication clients (e.g., $\text{Client}_A$, $\text{Client}_B$, other clients, A, B, C, D, or E of FIG. 1A, FIG. 1B or FIG. 1C) operated by participants (e.g., participant i, participant j, participant k), some of whom may be talking participants at any given time in a communication service session that generate uplink VAD packets to a media server (e.g., 108 of FIG. 1C) to a media server (e.g., 102 of FIG. 1A, FIG. 1B or FIG. 1C). By way of example and not limitation, an analysis window comprises audio content of three talkspurts derived from three uplinks to the media server (108). Each of the three uplinks to the media server (108) is an uplink (e.g., in a communication service network 104 of FIG. 1A or FIG. 1C) that delivers uplink audio content from a respectively one of participants i, j and k to the media server (108).

In the present example, a first communication client ($\text{Client}_A$) suffers from packet loss in two problematic regions that are located in two talkspurts of participants j and k. For the purpose of illustration, the two problematic regions experienced by the first communication client ($\text{Client}_A$) are represented by two shaded portions of two talkspurts of participants j and k in FIG. 5. In comparison, a second communication client ($\text{Client}_B$) suffers from packet loss in three problematic regions that are located in all three talkspurts of participants i, j and k. For the purpose of illustration, the three problematic regions experienced by the second communication client ($\text{Client}_B$) are represented by three shaded portions of three talkspurts of participants i, j and k in FIG. 5. In particular, in a portion (an overlapped shaded portion between the first communication client ($\text{Client}_A$) and the second communication client ($\text{Client}_B$)) of the talkspurt of participant k, both the first communication client ($\text{Client}_A$) and the second communication client ($\text{Client}_B$) experience packet loss.

The first communication client ($\text{Client}_A$) may be configured to detect/identify a problematic region such as a first problematic region in the talkspurt of participant j, a second problematic region in the talkspurt of participant k, etc., for example, based on Conditions 1 and 2 in expressions (4) and (5). In response to detecting/identifying a problematic region such as the first problematic region in the talkspurt of participant j, the second problematic region in the talkspurt of participant k, etc., the first communication client ($\text{Client}_A$) may be configured to send a request for bitstream quality information of the problematic region to a peer communication client as determined by first routing metadata received by the first communication client ($\text{Client}_A$) from the media server (108). For the purpose of illustration, the peer communication client for the first communication client ($\text{Client}_A$) is the second communication client ($\text{Client}_B$). The request for the bitstream quality information of the problematic region sent by the first communication client ($\text{Client}_A$) to the second communication client ($\text{Client}_B$) may include, but is necessarily limited to only, a location (e.g., sequence numbers of audio frames indicating a beginning or an end of the problematic region of a shaded area of FIG. 5, sequence numbers of audio frames immediately adjacent to the problematic region of a shaded area of FIG. 5) of the problematic region in the communication service session.

In response to receiving the request from the first communication client ($\text{Client}_A$) with the location of the problematic region in the analysis window, the second communication client ($\text{Client}_B$) may be configured to perform one or more problematic region evaluation operations to derive/extract/retrieve bitstream quality information from audio content of the problematic region experienced by the first communication client ($\text{Client}_A$) but not experienced by the second communication client ($\text{Client}_B$). In some embodiments, the second communication client ($\text{Client}_B$) may be configured to apply a perceptual importance level checker to identify a perceptual importance level of the problematic region. In a non-limiting implementation example, if the problematic region belongs to a trivial part of speech, one, two, three or more bits with a relatively low quantized value is included in the bitstream quality information sent to the first communication client ($\text{Client}_A$) by the second communication client ($\text{Client}_B$) as a response to the request of the first communication client ($\text{Client}_A$). On the other hand, if the problematic region belongs to an important part (e.g., comprising key words, a salient part of a syllable, key words for better intelligibility, key phonetic area for better quality) of speech, one, two, three or more bits with a relatively high quantized value is included in the bitstream quality information sent to the first communication client ($\text{Client}_A$) by the second communication client ($\text{Client}_B$) as a response to the request of the first communication client ($\text{Client}_A$).

Similarly, the second communication client ($\text{Client}_B$) may be configured to detect/identify a problematic region such as a third problematic region in the talkspurt of participant i, a fourth problematic region in the talkspurt of participant j, a fifth problematic region in the talkspurt of participant k, etc., for example, based on Conditions 1 and 2 in expressions (4) and (5). In response to detecting/identifying a problematic region such as the third problematic region in the talkspurt of participant i, the fourth problematic region in the talkspurt of participant j, the fifth problematic region in the talkspurt of participant k, etc., the second communication client ($\text{Client}_B$) may be configured to send a request for bitstream quality information of the problematic region to a peer communication client as determined by second routing metadata received the second communication client ($\text{Client}_B$) from the media server (108). For the purpose of illustration, the peer communication client for the second communication client ($\text{Client}_B$) is the first communication client ($\text{Client}_A$). The request for the bitstream quality information of the problematic region sent by the second communication client ($\text{Client}_B$) to the first communication client ($\text{Client}_A$) may include, but is necessarily limited to only, a location (e.g., sequence numbers of audio frames indicating a beginning or an end of the problematic region of a shaded area of FIG. 5, sequence numbers of audio frames immediately adjacent to the problematic region of a shaded area of FIG. 5) of the problematic region in the communication service session.

In response to receiving the request from the second communication client ($\text{Client}_B$) with the location of the problematic region in the analysis window, the first communication client (Client$_A$) may be configured to perform one or more problematic region evaluation operations to derive/extract/retrieve bitstream quality information from audio content of the problematic region experienced by the second communication client (Client$_B$) but not experienced by the first communication client (Client$_A$). In some embodiments, the first communication client (Client$_A$) may be configured to apply a perceptual importance level checker to identify a perceptual importance level of the problematic region. In a non-limiting implementation example, if the problematic region belongs to a trivial part of speech, one, two, three or more bits with a relatively low quantized value is included in the bitstream quality information sent to the second communication client (Client$_B$) by the first communication client (Client$_A$) as a response to the request of the second communication client (Client$_B$). On the other hand, if the problematic region belongs to an important part (e.g., comprising key words, a salient part of a syllable, key words for better intelligibility, key phonetic area for better quality) of speech, one, two, three or more bits with a relatively high quantized value is included in the bitstream quality information sent to the second communication client (Client$_B$) by the first communication client (Client$_A$) as a response to the request of the second communication client (Client$_B$).

As shown in FIG. 5, the second problematic region (shaded area of audio content from participant k) experienced by the first communication client (Client$_A$) overlaps in a common portion with the fifth problematic region (shaded area of audio content from participant k) experienced by the second communication client (Client$_B$). Since both the first communication client (Client$_A$) and the second communication client (Client$_B$) are lack of bitstream quality information of the common portion, other communication clients may be invoked to provide the missing bitstream quality information of the common portion.

In a first non-limiting implementation examples, requests can be sent to the media server (108), which can provide a new communication client (e.g., an address thereof) with minimal delay distances to both the first communication client (Client$_A$) and the second communication client (Client$_B$) for requesting and obtaining the missing bitstream quality information. For example, a third communication client (Client$_C$) with minimal summed delay to the first communication client (Client$_A$) and the second communication client (Client$_B$) can be chosen as the nearest communication client in this scenario, as follows:

$$C=\arg\min_X(d_{XA}+d_{XB}); \quad (12)$$

Thus, bitstream quality information can be requested and sent from Client$_C$ (denoted as "other clients" in FIG. 5) to Client$_A$ and Client$_B$, as shown in FIG. 5.

In a second non-limiting implementation examples, one or both of the first communication client (Client$_A$) and the second communication client (Client$_B$) may utilize the locally stored routing metadata that has been most recently received from the media server (108) to determine a backup communication client other than the first communication client (Client$_A$) and the second communication client (Client$_B$) for requesting and obtaining the missing bitstream quality information.

Figure 6:
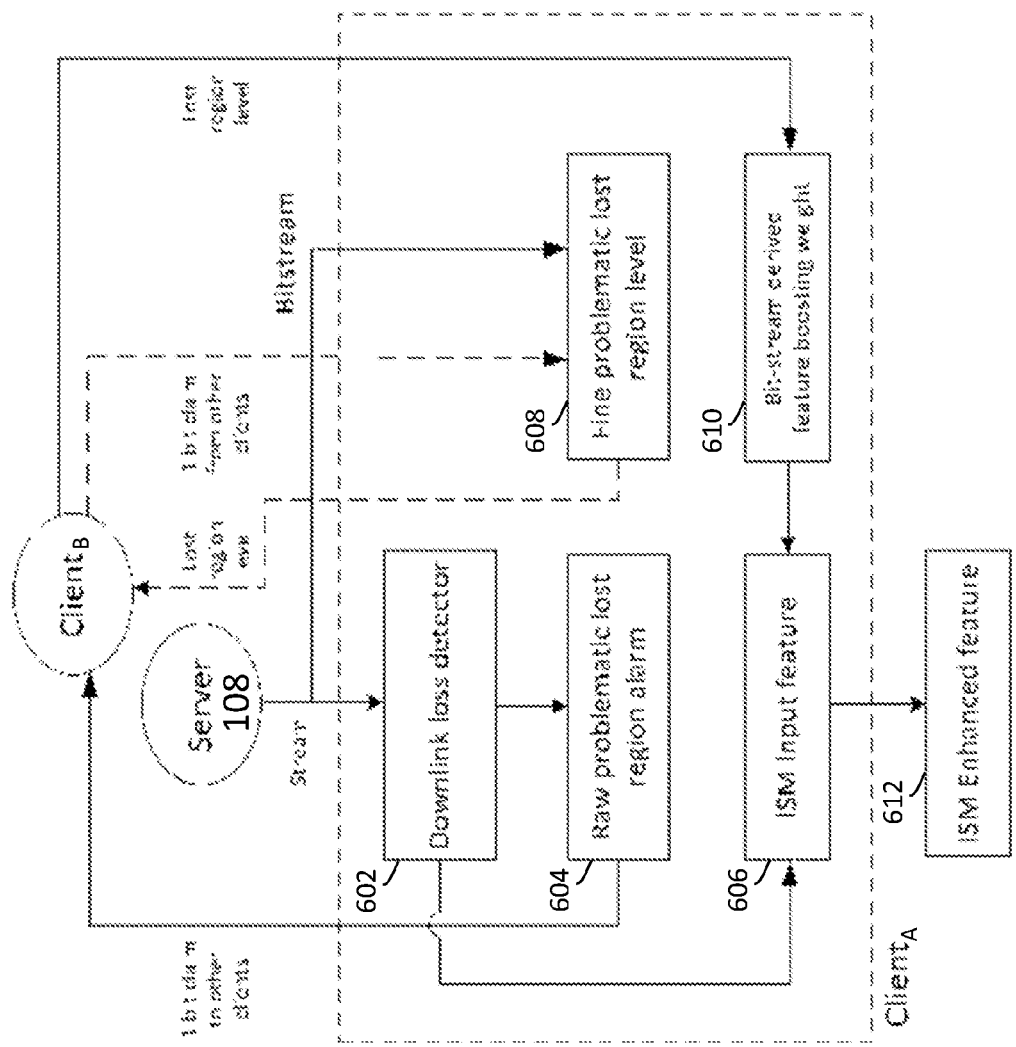
FIG. 6 illustrates an example of a first communication client operating in conjunction with an example media server and an example second communication client in accordance with example embodiments disclosed herein.

FIG. 6 illustrates an example first communication client (Client$_A$) operating in conjunction with an example media server (108) and an example second communication client (Client$_B$). In some embodiments, the first communication client (Client$_A$) comprises one or more modules implemented at least in part in hardware, such as a downlink loss detector 602, a raw problematic loss region alarm module 604, an in-service monitoring feature derivation module 606, a fine problematic lost region level determination module 608, a bitstream derived feature boosting weight assignment module 610, etc.

In some embodiments, the downlink loss detector (602) is configured to locate problematic regions of a decoded stream (e.g., a decoded bitstream, comprising audio frames) decoded by codec of the first communication client (Client$_A$) from service data packets received from the media server (108), for example, based on Conditions 1 and 2 in expressions (4) and (5). In some embodiments, the raw problematic loss region alarm module (604) is configured to identify a specific analysis window in which a specific problematic region of the problematic regions of the decoded stream is located, to send a request (denoted as "1-bit claim to other clients" with a solid arrow in FIG. 6) for bitstream quality information of the specific problematic region (e.g., including data fields such as a peer communication client, location or boundary of the specific problematic region in the decoded stream), etc. For the purpose of illustration, the first communication client (Client$_A$) sends the request to the second communication client (Client$_B$), which is indicated as the peer communication client to the first communication client (Client$_A$) by first routing metadata received by the first communication client (Client$_A$) from the media server (108).

In response to receiving the request from the first communication client (Client$_A$), the peer communication client (or the second communication client (Client$_B$) in the present example) locates a portion of decoded stream decoded by codec of the second communication client (Client$_B$) that corresponds to the problematic region experienced by the first communication client (Client$_A$); performs a fine problematic lost group detection to produce bitstream quality information of the problematic region experienced by the first communication client (Client$_A$); sends the bitstream quality information (denoted as "Lost region level" with a solid arrow in FIG. 6) back in a response to the first communication client (Client$_A$). The fine problematic lost group detection may be performed by a module of the second communication client (Client$_B$), which module is similar in functionality to the fine problematic lost region level determination module (608) of the first communication client (Client$_A$).

In some embodiments, the bitstream derived feature boosting weight assignment module (610) is configured to receive the bitstream quality information from the peer communication client (or the second communication client (Client$_B$) in the present example). The bitstream quality information can then be used as weight factors (e.g., perceptual weight factors) and combined with a feature set of the problematic region as extracted by the in-service monitoring feature derivation module (606) from the decoded stream for the purpose of generating a modified feature set represented by an enhanced feature set (612).

Similarly, the first communication client (Client$_A$) may be configured by the media server (108) as a peer communication client to other communication clients. For example, the first communication client (Client$_A$) may be designated by the media server (108) as a peer communication client to the second communication client (Client$_B$). The first communication client (Client$_A$) may receive, from the second communication client (Client$_B$), a request (denoted as "1-bit claim to other clients" with a broken arrow in FIG. 6) for bitstream quality information of a problematic region experienced by the second communication client (Client$_B$). In response, the first communication client (Client$_A$) may send to the second communication client (Client$_B$) a response (denoted as "Lost region level" with a broken arrow in FIG. 6) comprising the requested bitstream quality information of the problematic region experienced by the second communication client (Client$_B$).

8. Estimating Bitstream Quality Based on Adjacent Frames

In some embodiments, when bitstream quality information cannot be obtained from a peer communication client, a communication client as described herein is configured to obtain or estimate the bitstream quality information of a problematic region, for examples, by performing interpolation of adjacent frames immediately before or after the problematic region.

A problematic region experienced by a communication client causes damages and/or losses to audio content associated with the problematic region. In runtime, it may not be useful for the communication client to recover the actual audio content from other communication clients, as the damages and/or losses have already occurred in a real time communication service session. In addition, to estimate a perceptual importance level of the problematic region, the actual audio content of the problematic region may not be required; rather, the perceptual importance level may be estimated by the communication client experiencing the problematic region based on characteristics of adjacent audio frames, even if there is no peer communication client available for providing the perceptual importance level to the communication client experiencing the problematic region. However, the estimation of bitstream quality information about the problematic region may become less accurate as the number of damaged and/or lost audio frames (e.g., caused by packet loss), especially when dynamics and complexity of speech ion the communication service session increases. Less accurate estimation of bitstream quality information about problematic regions in turn impacts quality assessment of the communication service session or analysis windows therein.

For the purpose of illustration, a perceptual importance level of an audio frame or a part therein may be represented by a function Level (i), where i represents an index of the audio frame. In some embodiments, interpolation as described herein may be performed using Level (i) from N nearest adjacent (e.g., left) audio frames immediately before the problematic region and N nearest adjacent (e.g., right) audio frames immediately after the problematic region. When a lost audio frame is too far from the boundary of the problematic region, interpolation from these nearest adjacent audio frames may become less meaningful and less accurate. In some embodiments, a general value estimated from a longer prior history of audio frames may be used for the lost audio frame too far from the boundary of the problematic region.

One or more of a variety of different interpolation schemes can be used to estimate bitstream quality information such as a perceptual importance level of an audio frame or a portion therein. Additionally, optionally, or alternatively, in some embodiments, the perceptual importance level may be derived based on a non-linear mapping function of an input variable such as a MDCT gain, etc., derived from adjacent audio frames, a prior history of audio frames, etc.

Figure 7:
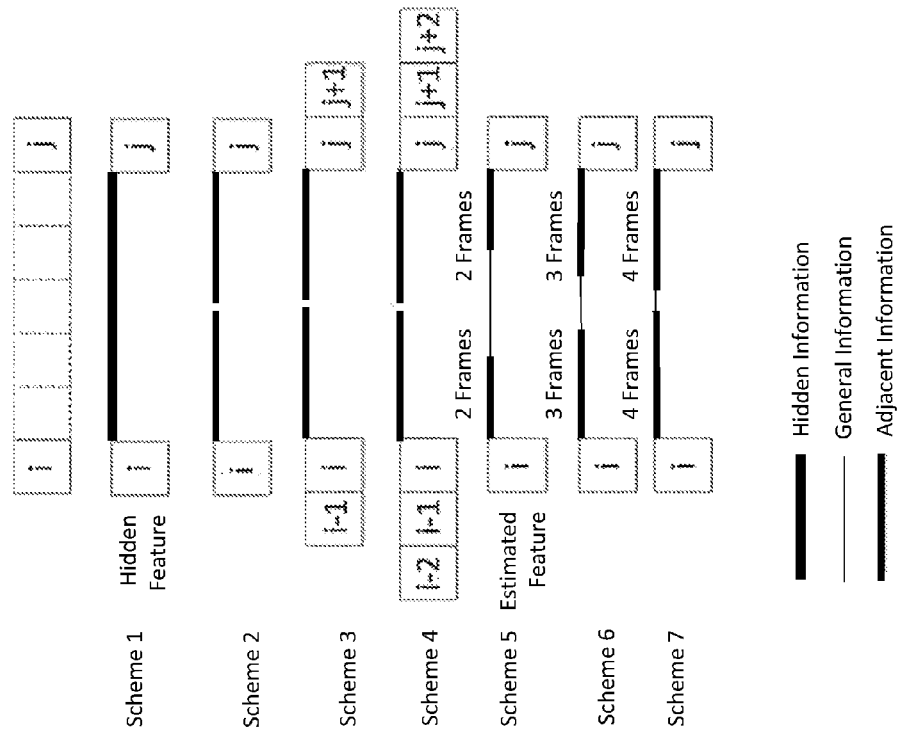
FIG. 7 illustrates an example of interpolation schemes in accordance with example embodiments disclosed herein.

FIG. 7 illustrates several example interpolation schemes. In Scheme 1 (hidden feature scheme), bitstream quality information such as a perceptual importance level of a lost audio frame or a portion thereof is estimated using an average of missing MDCT gain, which is relatively safe to use, statistically stable. In some embodiments, the average of the missing MDCT may be estimated or predicted (e.g., based on a prior history of VAD audio frame) as hidden information using Hidden Markov Model (HMM) techniques, packet loss concealment (PLC) techniques, or other suitable techniques.

In Scheme 2, bitstream quality information such as a perceptual importance level of a lost audio frame or a portion thereof is estimated from adjacent information derived from Level(i) and Level(j), where i and j are indexes of the left adjacent audio sample and the right adjacent audio sample, respectively. When speech articulation (e.g., intonation, attacks) changes relatively fast, the estimation or prediction based on Level (i) or Level (j) may be less accurate.

In Scheme 3, bitstream quality information such as a perceptual importance level of a lost audio frame or a portion thereof is estimated from adjacent information derived from Level (i−1), Level (i), Level (j), and Level (j+1), where (i−1), i, j and (j+1) are indexes of the second left adjacent audio frame, the left adjacent audio sample, the right adjacent audio sample, and the second right adjacent audio sample, respectively.

In Scheme 4, bitstream quality information such as a perceptual importance level of a lost audio frame or a portion thereof is estimated from adjacent information derived from Level (i−2), Level (i−1), Level (i), Level (j), Level (j+1), and Level (j+2), where (i−2), (i−1), i, j, (j+1) and (j+2) are indexes of the third left adjacent audio frame, the second left adjacent audio frame, the left adjacent audio sample, the right adjacent audio sample, the second right adjacent audio sample, and the third right adjacent audio sample, respectively.

In Scheme 5, only two lost audio frames adjacent to the boundary of the problematic region are estimated via Level (i) and Level(j), whereas the rest of audio frames in the problematic region is estimated with a general value as described herein.

In Scheme 6, only three lost audio frames adjacent to the boundary of the problematic region are estimated via Level (i) and Level (j), whereas the rest of audio frames in the problematic region is estimated with a general value as described herein.

In Scheme 7, only four lost audio frames adjacent to the boundary of the problematic region are estimated via Level (i) and Level (j), whereas the rest of audio frames in the problematic region is estimated with a general value as described herein.

In some embodiments, different schemes can be utilized in different types of problematic regions. For example, if the number of lost audio frames is sufficiently large (e.g., >20), Schemes 5-7 may not be suitable; in some embodiments, Scheme 1 may be used instead. If the number of lost audio frames is sufficiently small (e.g., <5), one or more of Schemes 2-7 that uses information derived from adjacent audio frames immediately before and after the problematic region may be used to estimate or predict bitstream quality information of missing audio frames in the problematic region. If the number of lost audio frames is medium sized (e.g., 5-20), one or more of Schemes 2-7 that uses information derived from adjacent audio frames immediately before and after the problematic region in combination with general information such as Schemes 5-7 may be used to estimate or predict bitstream quality information of missing audio frames in the problematic region.

Some embodiments have been described with voice-over-Internet-Protocol (VoIP) communication services, VoIP call services, VoIP conference call services, or internet-based communication services. It should be noted that these are for illustration purposes only. Embodiments are not limited to only these services. In various embodiments, other types of services and/or other types of networks other than previously mentioned may be used with techniques as described herein. For example, techniques as described herein can be applied to voice over LTE (VoLTE), voice over Internet (VOI), voice over Wi-Fi (VoWiFi), voice services provided by way of an IP multimedia subsystem (IMS) to end users employing rich communication services (RCS) such as Joyn.

9. Example Process Flows

Figure 8A:
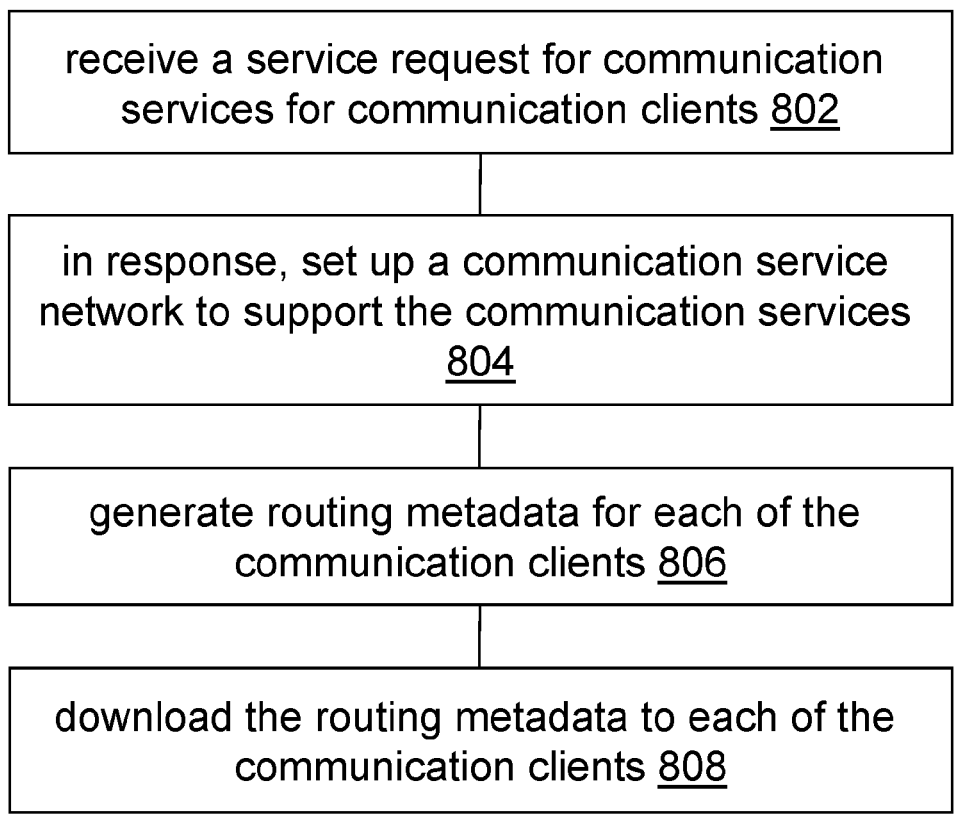
FIG. 8A and FIG. 8B illustrate an example of a process flows system in accordance with example embodiments disclosed herein.

FIG. 8A illustrates an example process flow according to an example embodiment of the present invention. In some example embodiments, one or more computing devices or components may perform this process flow. In block 802, a communication server (e.g., 102 of FIG. 1A, FIG. 1B or FIG. 1C) receives a service request for one or more communication services for two or more communication clients.

In response to receiving the service request, in block 804, the communication server (102) sets up a communication service network to support the one or more communication services.

In block 806, the communication server (102) generates routing metadata for each of the two or more communication clients, the routing metadata to be used by each of the two or more communication clients for sharing service quality information with a respective peer communication client over a light-weight P2P network.

In block 808, the communication server (102) downloads the routing metadata to each of the two or more communication clients.

In some embodiments, the one or more communication services comprise one or more of voice-over-Internet-Protocol (VoIP) communication services, VoIP call services, VoIP conference call services, internet-based communication services, etc.

In some embodiments, the one or more communication services are provided to the two or more communication clients in a communication service session; the light-weight P2P network is set up by a communication server at or before the communication service session.

In some embodiments, the communication server (102) is further configured to perform: deriving uplink service quality information of one or more uplink bitstreams respectively transmitted by one or more far-end communication clients; sending audio content in the one or more uplink bitstreams along with the uplink service quality information to a near-end communication client; etc.

In some embodiments, the communication server (102) is further configured to perform: deriving uplink service quality information of one or more uplink bitstreams respectively transmitted by one or more far-end communication clients; aggregating the uplink service quality information of the one or more uplink bitstreams into aggregated service quality information; sending audio content in the one or more uplink bitstreams along with the aggregated service quality information to a near-end communication client; etc.

In some embodiments, the service quality information from the respective peer communication client comprises a perceptual importance level of a problematic region experienced by a recipient communication client.

In some embodiments, at least one of the communication service network or the light-weight P2P network is built by a communication service network after the communication service network receives the service request over an underlying network that exists before the communication server receives the service request.

In some embodiments, the service quality information is related to a problematic region, which represents a loss of at least one audio frame within an analysis window of a communication service session, as experienced by a recipient communication client.

In some embodiments, the communication server (102) is further configured to transmit one or more of service signaling packets or service signaling packets to at least one of the two or more communication clients.

Figure 8B:
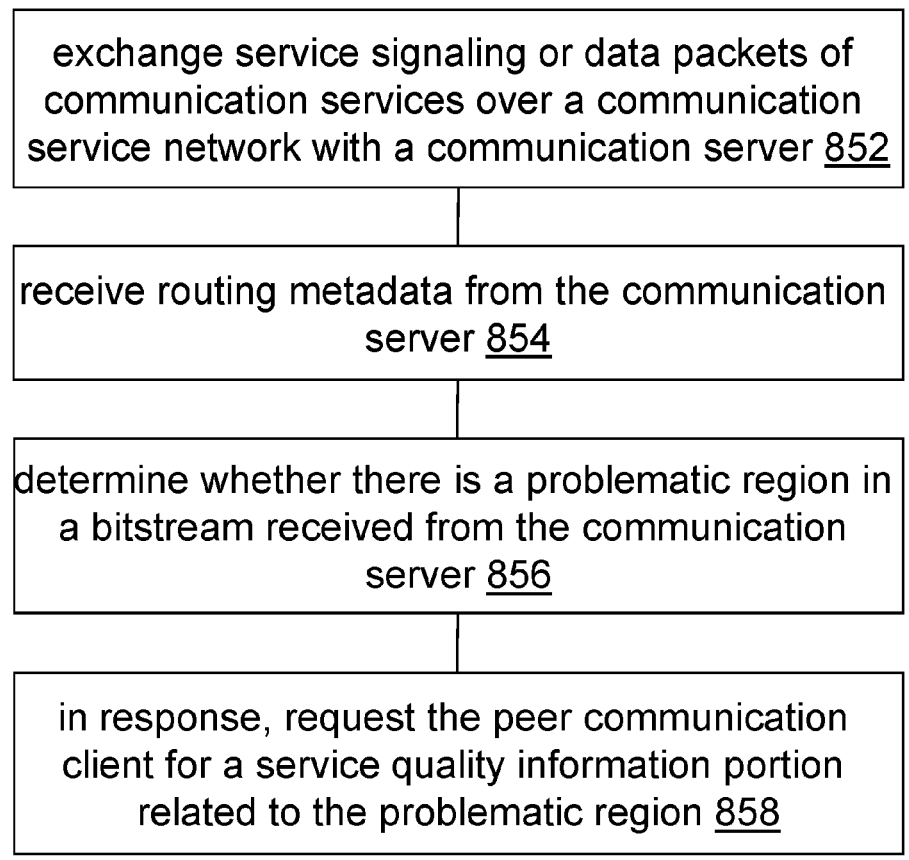

FIG. 8B illustrates an example process flow according to an example embodiment of the present invention. In some example embodiments, one or more computing devices or components may perform this process flow. In block 852, a communication client (e.g., A, B, C, D, or E of FIG. 1A, FIG. 1B or FIG. 1C) exchanges one or more of service signaling packets or service data packets of one or more communication services over a communication service network with a communication server.

In block 854, the communication client receives routing metadata from the communication server, the routing metadata to be used for requesting service quality information with a peer communication client over a light-weight P2P network.

In block 856, the communication client determines whether there is a problematic region in a bitstream received from the communication server.

In response to determining that there is a problematic region in the bitstream received from the communication server, in block 858, the communication client requests the peer communication client for a service quality information portion related to the problematic region.

In some embodiments, the communication client is further configured to receive downlink audio content over a downlink from the communication server to a recipient communication client. The downlink audio content may be derived from uplink audio content of one or more uplink bitstreams received by the communication server from one or more uplinks from one or more far-end communication clients to the communication server.

In some embodiments, the communication client is further configured to receive downlink service quality information of the downlink audio content with the downlink audio content over the downlink from the communication server to the recipient communication client.

In some embodiments, the communication client is further configured to perform: deriving uplink service quality information of the one or more uplink bitstreams from the downlink service quality information of the downlink audio content; aggregating the uplink service quality information of the one or more uplink bitstreams into aggregated service quality information; etc.

In some embodiments, the service quality information portion related to the problematic region comprises a perceptual importance level of the problematic region.

In some embodiments, the communication client is further configured to perform: determining whether the peer communication client returns the service quality information portion related to the problematic region; in response to determining that the peer communication client fails to return the service quality information portion related to the problematic region, generating the service quality information portion related to the problematic region; etc.

In some embodiments, the service quality information portion related to the problematic region is generated using one or more of hidden Markov model techniques, packet loss concealment techniques, or interpolations based on one or more adjacent audio frames immediately before or immediately after lost or damaged audio frames in the problematic region.

In some embodiments, the communication client is further configured to perform: determining an individual perceptual importance level for each problematic region in an analysis window; deriving one or more features of each problematic region in the analysis window; assigning one or more weight factors to the one or more features of each problematic region in the analysis window, the one or more weight factors being dependent on the individual perceptual importance level; deriving, based on the one or more weight factors and the one or more features, a quality score for the one or more communication services in the analysis window; etc.

In some embodiments, the communication client is further configured to perform: receiving a second request for a second service quality information portion of a bitstream portion from a second communication client, the second request comprising location information of the bitstream portion in two or more bitstreams delivered by the communication server to the two or more communication clients that include the second communication client; generating the service quality information portion of the bitstream portion from one of the two or more bitstreams delivered by the communication server; returning the service quality information portion of the bitstream portion to the second communication client; etc.

In various example embodiments, an apparatus, a system, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

10. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
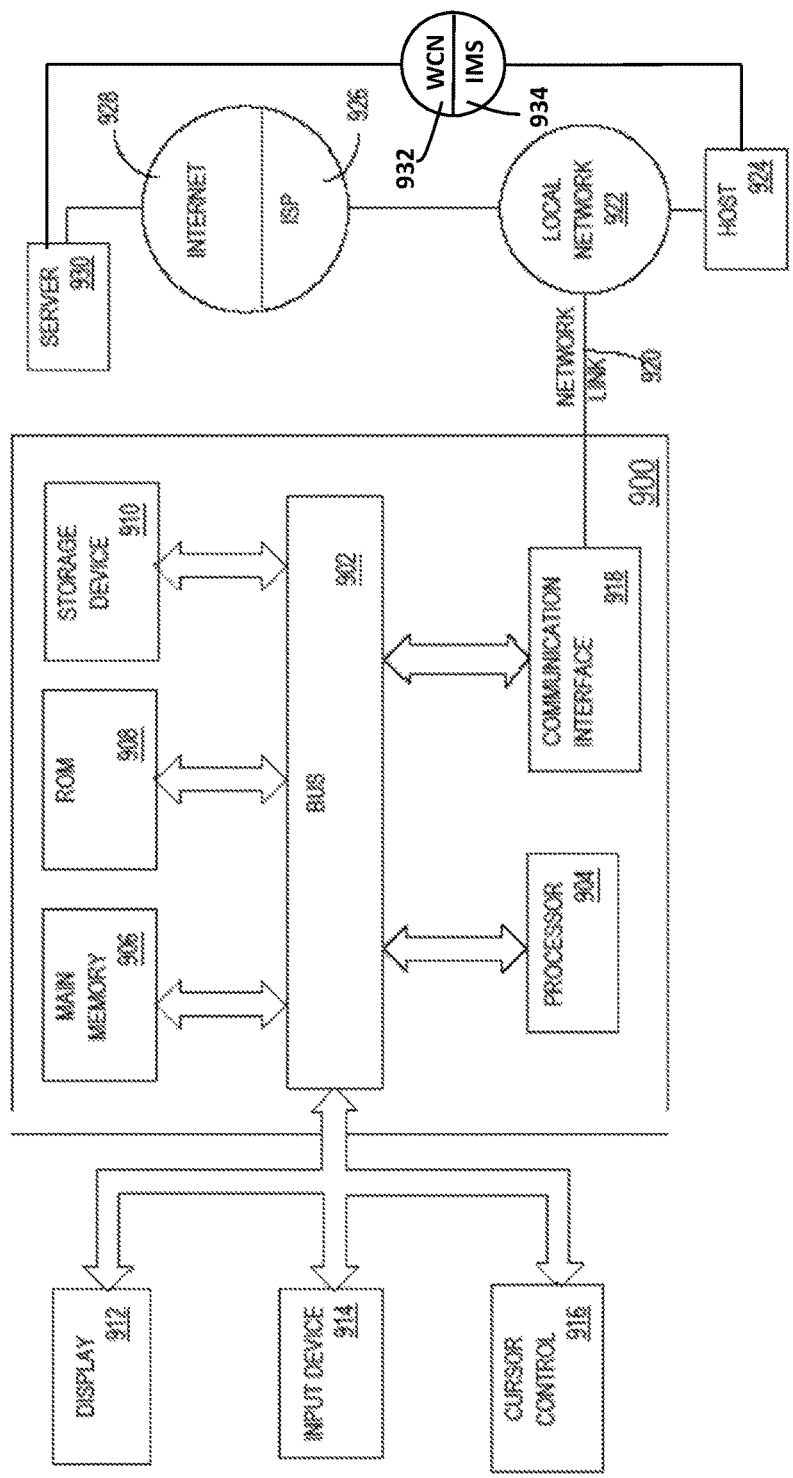
FIG. 9 illustrates a simplified block diagram of an example hardware platform on which a computer or a computing device as described herein may be implemented.

For example, FIG. 9 is a block diagram that illustrates a computer system 900 upon which an example embodiment of the invention may be implemented. Computer system 900 includes a bus 902 or other communication mechanism for communicating information, and a hardware processor 904 coupled with 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904.

A storage device 910, such as a magnetic disk or optical disk, is provided and coupled to bus 902 for storing information and instructions.

Computer system 900 may be coupled via bus 902 to a display 912, such as a liquid crystal display, for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. As illustrated in FIG. 9, a network connection may be made at least in part through radio frequency (RF) links to a wireless cellular network (WCN) 932 or through RF or landline network links to an IP multimedia system (IMS) 934. Also, computer system 900 may communicate using near-field communications (not shown) by way of communication interface 918 or may communication by way of a universal asynchronous receiver/transmitter (UART). For example, RF links as described herein may be based on a variety of wireless networks such as LTE and other advanced WiFi networks. In some embodiments, techniques as described herein can support a variety of networks such as cellular networks. These cellular networks may include, without limitation, Universal Mobile Telecommunications System (UMTS) Terrestrial Radio Access (UTRA)/evolved (eUTRA) supporting an LTE/LTE-A air interface as well as any available wireless systems which provide IMS services, and WiFi Networks (e.g., IEEE 802.16 WiMAX and WiGiga). Also, some or all of techniques as described herein can be used to support transmission and receiving operations with multiple input multiple output (MIMO) functionality. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

11. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method performed by a server of communication services, comprising:
   receiving a service request, from a communication client, for one or more communication services for two or more communication clients;
   in response to receiving the service request, setting up a communication service network to support the one or more communication services, the communication service network comprising uplinks from and downlinks to the two or more communication clients for transporting service signaling packets and service data packets;
   generating routing metadata for each of the two or more communication clients, the routing metadata to be used by each of the two or more communication clients for sharing service quality information of the one or more communication services supported by the communication service network with a respective peer communication client over a light-weight peer-to-peer (P2P) network separate from the communication service network;
   downloading the routing metadata to each of the two or more communication clients;
   wherein a first communication client of the two or more communication clients shares one or more portions of the service quality information of the one or more communication services supported by the communication service network with a second communication client of the two or more communication clients over the P2P network while the two or more communication clients engage in at least audio communications using the one or more communication services over the communication service network.

2. The method of claim 1, wherein the one or more communication services comprise one or more of voice-over-Internet-Protocol (VoIP) communication services, VoIP call services, VoIP conference call services, or internet-based communication services.

3. The method of claim 1, wherein the one or more communication services are provided to the two or more communication clients in a communication service session, and wherein the light-weight P2P network is set up by a communication server at or before the communication service session.

4. The method of claim 1, further comprising:
deriving uplink service quality information of one or more uplink bitstreams respectively transmitted by one or more far-end communication clients;
sending audio content in the one or more uplink bitstreams along with the uplink service quality information to a near-end communication client.

5. The method of claim 1, further comprising:
deriving uplink service quality information of one or more uplink bitstreams respectively transmitted by one or more far-end communication clients;
aggregating the uplink service quality information of the one or more uplink bitstreams into aggregated service quality information;
sending audio content in the one or more uplink bitstreams along with the aggregated service quality information to a near-end communication client.

6. The method of claim 1, wherein the service quality information from the respective peer communication client comprises a perceptual importance level of a problematic region experienced by a recipient communication client.

7. The method of claim 1, wherein at least one of the communication service network or the light-weight P2P network is built by a communication server after the communication server receives the service request over an underlying network that exists before the communication server receives the service request.

8. The method of claim 1, wherein the service quality information is related to a problematic region, which represents a loss of at least one audio frame within an analysis window of a communication service session, as experienced by a recipient communication client.

9. The method of claim 1, further comprising transmitting one or more service signaling packets to at least one of the two or more communication clients.

10. A non-transitory computer readable storage medium, storing software instructions, which when executed by one or more processors cause performance of the method recited in claim 1.

11. A computing device comprising one or more processors and one or more storage media, storing a set of instructions, which when executed by one or more processors cause performance of the method recited in claim 1.

12. An apparatus comprising:
one or more computer processors that implements a server of communication services;
a non-transitory computer readable storage medium, storing software instructions, which when executed by the one or more computer processors cause the one or more computer processors to perform:
receiving a service request, from a communication client, for one or more communication services for two or more communication clients;
in response to receiving the service request, setting up a communication service network to support the one or more communication services, the communication service network comprising uplinks from and downlinks to the two or more communication clients for transporting service signaling packets and service data packets;
generating routing metadata for each of the two or more communication clients, the routing metadata to be used by each of the two or more communication clients for sharing service quality information of the one or more communication services supported by the communication service network with a respective peer communication client over a light-weight peer-to-peer (P2P) network separate from the communication service network;
downloading the routing metadata to each of the two or more communication clients;
wherein a first communication client of the two or more communication clients shares one or more portions of the service quality information of the one or more communication services supported by the communication service network with a second communication client of the two or more communication clients over the P2P network while the two or more communication clients engage in at least audio communications using the one or more communication services over the communication service network.

* * * * *